US012231867B2

(12) United States Patent
Vilkamo et al.

(10) Patent No.: US 12,231,867 B2
(45) Date of Patent: Feb. 18, 2025

(54) AUDIO PROCESSING

(71) Applicant: NOKIA TECHNOLOGIES OY, Espoo (FI)

(72) Inventors: Juha Vilkamo, Helsinki (FI); Riitta Väänänen, Helsinki (FI); Sampo Vesa, Helsinki (FI); Mikko-Ville Laitinen, Espoo (FI); Jussi Virolainen, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 14 days.

(21) Appl. No.: 17/638,393

(22) PCT Filed: Sep. 17, 2020

(86) PCT No.: PCT/FI2020/050596
§ 371 (c)(1),
(2) Date: Feb. 25, 2022

(87) PCT Pub. No.: WO2021/058858
PCT Pub. Date: Apr. 1, 2021

(65) Prior Publication Data
US 2022/0295212 A1 Sep. 15, 2022

(30) Foreign Application Priority Data
Sep. 24, 2019 (GB) ..................................... 1913726

(51) Int. Cl.
*H04S 7/00* (2006.01)
*H04R 5/04* (2006.01)

(52) U.S. Cl.
CPC ............... *H04S 7/302* (2013.01); *H04R 5/04* (2013.01); *H04S 2400/09* (2013.01); *H04S 2420/01* (2013.01)

(58) Field of Classification Search
None
See application file for complete search history.

(56) References Cited

U.S. PATENT DOCUMENTS 10,873,814 B2 12/2020 Vilkamo et al.
11,317,231 B2 4/2022 Vilkamo et al.
(Continued)

FOREIGN PATENT DOCUMENTS

CN 104604257 A 5/2015
CN 106664500 A 5/2017
(Continued)

OTHER PUBLICATIONS

He, J., "3D Sound Effect Analysis, Synthesis and Application Design—A Primary-Ambient Extraction Approach", IEEE Signal Processing Society SigPort, (2015), 33 pages.
(Continued)

*Primary Examiner* — Mark Fischer
(74) *Attorney, Agent, or Firm* — ALSTON & BIRD LLP

(57) ABSTRACT

According to an example embodiment, a method for processing an input audio signal (101) in accordance with spatial metadata (103) so as to play back a spatial audio signal in a device (50) in dependence of at least one sound reproduction characteristic (105) of the device is provided, the method comprising obtaining said input audio signal (101) and said spatial metadata (103); obtaining said at least one sound reproduction characteristic (105) of the device; rendering a first portion of the spatial audio signal using a first type playback procedure applied on the input audio signal in dependence of the spatial metadata (103), wherein the first portion comprises sound directions within a front region of the spatial audio signal; and rendering a second portion of the spatial audio signal using a second type playback procedure applied on the input audio signal in dependence of the spatial metadata (103) and in dependence
(Continued)

100 of said at least one sound reproduction characteristic (105), wherein the second portion comprises sound directions that are not included in the first portion and where the second type playback procedure is different from the first playback procedure and involves cross-talk cancellation processing.

20 Claims, 8 Drawing Sheets

(56) References Cited

U.S. PATENT DOCUMENTS

| | | | |
|---|---|---|---|
| 2015/0223002 | A1 | 8/2015 | Mehta et al. |
| 2015/0350804 | A1 | 12/2015 | Crockett et al. |
| 2016/0080886 | A1 | 3/2016 | De Bruijn et al. |
| 2016/0249151 | A1 | 8/2016 | Grosche et al. |
| 2017/0034639 | A1 | 2/2017 | Chon |
| 2017/0245055 | A1 | 8/2017 | Sun et al. |
| 2020/0053461 | A1 | 2/2020 | Suenaga et al. |
| 2021/0337339 | A1 | 10/2021 | Vilkamo et al. |
| 2022/0014866 | A1 | 1/2022 | Vesa et al. |

FOREIGN PATENT DOCUMENTS

| | | | |
|---|---|---|---|
| CN | 107509141 | A | 12/2017 |
| WO | WO 03/053099 | A1 | 6/2003 |
| WO | WO 2008/135049 | A1 | 11/2008 |
| WO | WO 2016/023581 | A1 | 2/2016 |
| WO | WO 2018/060550 | A1 | 4/2018 |
| WO | WO 2018/132417 | A1 | 7/2018 |
| WO | WO 2018/173413 | A1 | 9/2018 |
| WO | WO 2018/213159 | A1 | 11/2018 |
| WO | WO 2018/234624 | A1 | 12/2018 |
| WO | WO 2018/234625 | A1 | 12/2018 |
| WO | WO 2019/086757 | A1 | 5/2019 |
| WO | WO 2019/089322 | A1 | 5/2019 |

OTHER PUBLICATIONS

Lacouture-Parodi et al., "Crosstalk Cancellation System Using A Head Tracker Based on Interaural Time Differences", International Workshop on Acoustic Signal Enhancement 2012, (Sep. 4-6, 2012), 4 pages.

Laitinen et al., "Binaural Reproduction for Directional Audio Coding", 2009 IEEE Workshop on Applications of Signal Processing to Audio and Acoustics, (Oct. 18-21, 2009), pp. 337-340.

Vilkamo et al., "Minimization of decorrelator artifacts in directional audio coding by covariance domain rendering", Journal of the Audio Engineering Society, 61(9), (2013), pp. 637-646.

Pulkki, V. (Jun. 2006). Directional audio coding in spatial sound reproduction and stereo upmixing. In Audio Engineering Society Conference: 28th International Conference: The Future of Audio Technology—Surround and Beyond. Audio Engineering Society.

Kirkeby et al., "Fast deconvolution of multichannel systems using regularization," IEEE Transactions on Speech and Audio Processing, vol. 6, No. 2, pp. 189-194, 1998.

Bharitkar et al., "Immersive Audio Synthesis and Rendering Over Loudspeakers", Immersive Audio Signal Processing, ch. 4, Springer, (2006), 23 pages.

Vilkamo et al., "Optimized Covariance Domain Framework for Time-Frequency Processing of Spatial Audio", Journal of the Audio Engineering Society, vol. 61, No. 6, (Jun. 2013), pp. 403-411.

International Search Report and Written Opinion for Patent Cooperation Treaty Application No. PCT/FI2020/050596 dated Jan. 25, 2021, 18 pages.

Politis et al., "Enhancement of Ambisonic Binaural Reproduction Using Directional Audio Coding with Optimal Adaptive Mixing", Proceedings of the 2017 IEEE Workshop on Applications of Signal Processing to Audio and Acoustics (WASPAA), (Oct. 15-18, 2017), 5 pages.

Search Report for United Kingdom Application No. GB1913726.4 dated Mar. 24, 2020, 1 page.

Office Action for Chinese Application No. 202080066763.X dated Jun. 21, 2024, 12 pages.

Office Action for Chinese Application No. 202080066763.X dated Nov. 7, 2024, 9 pages.

AUDIO PROCESSING

CROSS-REFERENCE TO RELATED APPLICATIONS

The present application is a national phase entry of International Application No. PCT/FI2020/050596, filed Sep. 17, 2020, which claims priority to Finnish Application No. 1913726.4, filed Sep. 24, 2019, which are incorporated herein by reference in their entirety.

TECHNICAL FIELD

The example and non-limiting embodiments of the present invention relate to processing of audio signals. In particular, various embodiments of the present invention relate to device specific rendering of a spatial audio signal, such as a stereo signal with associated spatial metadata.

BACKGROUND

Many portable handheld devices such as mobile phones, portable media player devices, tablet computers, laptop computers, etc. have a pair of loudspeakers that enable playback of stereophonic sound. Typically, the two loudspeakers are positioned at opposite ends or sides of the device to maximize the distance therebetween and thereby facilitate reproduction of stereophonic audio. However, due to small sizes of such devices the two loudspeakers are typically still relatively close to each other, thereby in many cases resulting in compromised spatial audio image in the reproduced stereophonic audio. In particular, the perceived spatial audio image may be quite different from that perceivable by playing back the same stereophonic audio signal e.g. via loudspeakers of a home stereo system, where the two loudspeakers can be arranged in suitable positions with respect to each other (e.g. sufficiently far from each other) to ensure reproduction of spatial audio image in its full width or via headphones that enables reproducing the sound at substantially fixed positions with respect to the listener's ears.

While the two-channel stereophonic signal serves as a traditional example of multi-channel sound reproduction that involves spatial characteristics to some extent, more advanced spatial audio reproduction may be provided via parametric spatial audio signals. In this disclosure, the term parametric spatial audio signal refers to an audio signal provided together with associated spatial metadata. This audio signal may comprise a single-channel audio signal or a multi-channel audio signal and it may be provided as a time-domain audio signal (e.g. such as linear PCM at a given number of bits per sample and a given sample rate) or as an encoded audio signal that has been encoded using an audio encoder known in the art (and, consequently, needs to be decoded using a corresponding audio decoder before playback). The spatial metadata conveys information that defines at least some characteristics of spatial rending of the audio signals, provided for example as a set of spatial audio parameters. The spatial audio parameters may comprise, for example, one or more sound direction parameters that define sound direction(s) in respective one or more frequency sub-bands and one or more energy ratio parameters that define a ratio between an energy of a directional sound component and total energy at respective frequency sub-bands.

At audio rendering stage, the spatial metadata is applied to control the processing of the audio signal to form the output audio signal in a desired spatial audio rendering format. The applicable spatial audio rendering format depends on the audio hardware intended (and/or available) for rending of the spatial audio signal. Non-limiting examples of spatial audio rendering formats include a (two-channel) binaural audio signal, an Ambisonic (spherical harmonic) audio format, or a (specified) multi-loudspeaker audio format (such as 5.1-channel or 7.1. surround sound). Procedures suitable for converting parametric spatial audio signals into a spatial audio rendering format of interest are well known in the art. In this regard, see for example [1] for audio rendering using Ambisonic-based audio rendering, [2] for audio rendering for binaural output and [3] for audio rendering for multi-loudspeaker output. In a typical scenario, the audio signal is processed in accordance with the spatial metadata (separately) in a plurality of frequency sub-bands, e.g. in those frequency sub-bands for which the associated spatial metadata is provided. Various other audio processing procedures may be applied to the parametric spatial audio signal before conversion to the spatial audio rendering format of interest and/or such audio processing procedures may be provided as part of the conversion from the parametric spatial audio signal to the spatial audio rendering format of interest. Non-limiting examples of such audio processing procedures include (automatic) gain control, audio equalization, noise processing, audio focus processing and dynamic range processing.

A parametric spatial audio signal may be derived, for example, based on two or more microphone signals obtained from respective two or more microphones of a capturing device or via conversion from a spatial audio signal provided in another audio format (e.g. in a spatial audio rendering format such as a given multi-loudspeaker audio format). The derived parametric spatial audio signal may rely on spatial metadata comprising respective sound direction parameters and energy ratio parameters for a plurality of frequency sub-bands based on two or more microphone signals obtained from respective two or more microphones of a capturing device. Deriving such a parametric spatial audio signal may be an advantageous choice, for example, for microphone signals originating from a microphone array of a portable consumer device such as a mobile phone, a tablet computer or a digital camera where the size and/or shape of the device pose limitations for positioning the two or more microphones in the device. Practical experiments have shown that traditional 'linear' audio capture techniques typically have significant limitations in terms of capturing a high-quality spatial audio from typical microphone arrays available in such devices, whereas audio capturing techniques that operate to record parametric spatial audio signal (directly) based on the microphone signals typically enable high-quality spatial audio.

Cross-talk cancellation is an audio processing technique that is typically advantageous in binaural audio reproduction using a pair of loudspeakers in order to enable controlled sound reproduction to the left and right ears of the listener, thereby enabling binaural playback from the loudspeakers instead of headphones. Another application where cross-talk cancellation is typically applied is stereo widening, where an input audio signal is processed into one that conveys a widened stereo image that typically spans beyond the width of the physical loudspeaker setup, thereby enabling enhanced spatial sound reproduction especially in devices where the loudspeakers applied for stereophonic playback are positioned close to each other. Cross-talk cancellation addresses the acoustic situation where a sound arrives from both loudspeakers to the both ears of the listener: cross-talk cancellation processing aims at ensuring sound reproduction from the loudspeakers in a controlled manner such that acoustic signal cancellation occurs at least at a certain frequency range so that sound can be reproduced to the user's ears in a manner similar to a scenario where the user wears headphones to listen to the binaural or stereophonic audio. As an example, cross-talk cancellation technique in context of stereo widening has been proposed, e.g., in [4] and [5], whereas cross-talk cancellation is applicable also e.g. in sound reproduction systems that employ more than two loudspeakers.

Referring back to the audio rendering stage, the spatial audio rendering formats, e.g. the binaural audio, Ambisonic and multi-channel loudspeaker formats referred to above, do not themselves take into account audio reproduction characteristics that are specific to the audio hardware applied for sound reproduction. This, however, may be a significant factor affecting the perceivable sound quality, especially in reproduction of spatial sound via loudspeakers of a mobile device such as a mobile phone, a portable media player device, a tablet computer, a laptop computer, etc. Typically, when reproducing a parametric spatial audio signal using loudspeakers of such a device, one of the following options may be applied.

- Converting the parametric spatial audio signal into a 'traditional' two-channel stereo format for playback via the pair of loudspeakers of the mobile device, which typically results in a narrow spatial audio image restricted by the width of the playback device.
- Converting the parametric spatial audio signal into a binaural audio signal and applying a cross-talk cancellation procedure known in the art to the binaural audio signal. While this approach typically provides acceptable sound reproduction in devices with two loudspeakers of substantially identical sound reproduction characteristics arranged symmetrically with respect to the (assumed) listening position, it results in poor sound quality in scenarios where e.g. the assumption of symmetry or similarity of sound reproduction characteristics does not apply—which is the case in many (multipurpose) mobile devices that are not designed for audio playback as their primary purpose.

Therefore, there is room for improvement in reproduction of the spatial parametric spatial audio signal via two or more loudspeakers to enable sound quality that is (more) readily comparable to that obtainable via headphone listening.

REFERENCES

[1] International patent publication WO 2018/060550 A1;

[2] Laitinen, Mikko-Ville; Pulkki, Ville, "*Binaural reproduction for directional audio coding*", 2009 IEEE Workshop on Applications of Signal Processing to Audio and Acoustics, pp. 337-340;

[3] Vilkamo, Juha; Pulkki, Ville, "*Minimization of decorrelator artifacts in directional audio coding by covariance domain rendering*", Journal of the Audio Engineering Society, vol. 61, no. 9, pp. 637-646;

[4] Kirkeby, O; Nelson, A; Hamada, H; Orduna-Bustamante, F, "*Fast deconvolution of multichannel systems using regularization*" IEEE Transactions on Speech and Audio Processing, vol. 6, no. 2, pp. 189-194, 1998;

[5] Bharitkar, S; Kyriakis, C, "*Immersive Audio Signal Processing*", ch. 4, Springer, 2006;

[6] Vilkamo, J; Backstrom, T; Kuntz, A, "*Optimized covariance domain framework for time-frequency processing of spatial audio*", Journal of the Audio Engineering Society, vol. 61, no. 6, pp. 103-411, 2013.

SUMMARY

According to an example embodiment, a method for processing an input audio signal in accordance with spatial metadata so as to play back a spatial audio signal in a device in dependence of at least one sound reproduction characteristic of the device is provided, the method comprising: obtaining said input audio signal and said spatial metadata; obtaining said at least one sound reproduction characteristic of the device; rendering a first portion of the spatial audio signal using a first type playback procedure applied on the input audio signal in dependence of the spatial metadata, wherein the first portion comprises sound directions within a front region of the spatial audio signal; and rendering a second portion of the spatial audio signal using a second type playback procedure applied on the input audio signal in dependence of the spatial metadata and in dependence of said at least one sound reproduction characteristic, wherein the second portion comprises sound directions that are not included in the first portion and where the second type playback procedure is different from the first playback procedure and involves cross-talk cancellation processing.

According to another example embodiment, an apparatus for processing an input audio signal in accordance with spatial metadata so as to play back a spatial audio signal in a device in dependence of at least one sound reproduction characteristic of the device is provided, the apparatus configured to: obtain said input audio signal and said spatial metadata; obtain said at least one sound reproduction characteristic of the device; render a first portion of the spatial audio signal using a first type playback procedure applied on the input audio signal in dependence of the spatial metadata, wherein the first portion comprises sound directions within a front region of the spatial audio signal; and render a second portion of the spatial audio signal using a second type playback procedure applied on the input audio signal in dependence of the spatial metadata and in dependence of said at least one sound reproduction characteristic, wherein the second portion comprises sound directions that are not included in the first portion and where the second type playback procedure is different from the first playback procedure and involves cross-talk cancellation processing.

According to another example embodiment, an apparatus for processing an input audio signal in accordance with spatial metadata so as to play back a spatial audio signal in a device in dependence of at least one sound reproduction characteristic of the device is provided, the apparatus comprising: a means for obtaining said input audio signal and said spatial metadata; a means for obtaining said at least one sound reproduction characteristic of the device; a means for rendering a first portion of the spatial audio signal using a first type playback procedure applied on the input audio signal in dependence of the spatial metadata, wherein the first portion comprises sound directions within a front region of the spatial audio signal; and a means for rendering a second portion of the spatial audio signal using a second type playback procedure applied on the input audio signal in dependence of the spatial metadata and in dependence of said at least one sound reproduction characteristic, wherein the second portion comprises sound directions that are not included in the first portion and where the second type playback procedure is different from the first playback procedure and involves cross-talk cancellation processing.

According to another example embodiment, an apparatus for processing an input audio signal in accordance with spatial metadata so as to play back a spatial audio signal in a device in dependence of at least one sound reproduction characteristic of the device is provided, wherein the apparatus comprises at least one processor; and at least one memory including computer program code, which, when executed by the at least one processor, causes the apparatus to: obtain said input audio signal and said spatial metadata; obtain said at least one sound reproduction characteristic of the device; render a first portion of the spatial audio signal using a first type playback procedure applied on the input audio signal in dependence of the spatial metadata, wherein the first portion comprises sound directions within a front region of the spatial audio signal; and render a second portion of the spatial audio signal using a second type playback procedure applied on the input audio signal in dependence of the spatial metadata and in dependence of said at least one sound reproduction characteristic, wherein the second portion comprises sound directions that are not included in the first portion and where the second type playback procedure is different from the first playback procedure and involves cross-talk cancellation processing.

According to another example embodiment, a computer program is provided, the computer program comprising computer readable program code configured to cause performing at least a method according to the example embodiment described in the foregoing when said program code is executed on a computing apparatus.

The computer program according to an example embodiment may be embodied on a volatile or a non-volatile computer-readable record medium, for example as a computer program product comprising at least one computer readable non-transitory medium having program code stored thereon, the program which when executed by an apparatus cause the apparatus at least to perform the operations described hereinbefore for the computer program according to an example embodiment of the invention.

The exemplifying embodiments of the invention presented in this patent application are not to be interpreted to pose limitations to the applicability of the appended claims. The verb "to comprise" and its derivatives are used in this patent application as an open limitation that does not exclude the existence of also unrecited features. The features described hereinafter are mutually freely combinable unless explicitly stated otherwise.

Some features of the invention are set forth in the appended claims. Aspects of the invention, however, both as to its construction and its method of operation, together with additional objects and advantages thereof, will be best understood from the following description of some example embodiments when read in connection with the accompanying drawings.

BRIEF DESCRIPTION OF FIGURES

The embodiments of the invention are illustrated by way of example, and not by way of limitation, in the figures of the accompanying drawings, where.

DESCRIPTION OF SOME EMBODIMENTS

Figure 1:
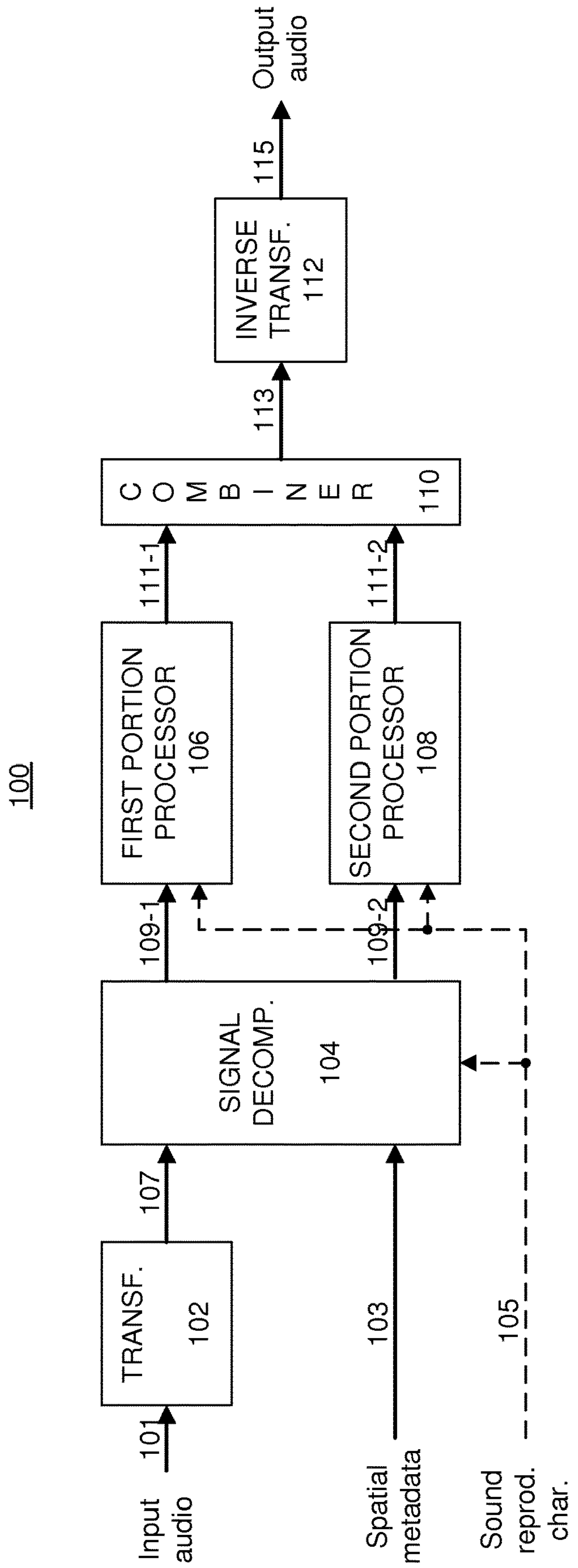
FIG. 1 illustrates a block diagram of some elements of an audio processing system according to an example.

FIG. 1 illustrates a block diagram of some components and/or entities of an audio processing system 100 that may serve as framework for various embodiments of the audio processing technique described in the present disclosure. The audio processing system 100 receives an input audio signal 101 and spatial metadata 103 that jointly constitute a parametric spatial audio signal. the audio processing system 100 further receives at least one sound reproduction characteristic 105 that serves as control input for controlling some aspects of audio processing in the audio processing system 100. The audio processing system 100 enables processing the parametric spatial audio signal into an output audio signal 115 of the audio processing system 100.

The input audio signal 101 comprises a single-channel audio signal or a multi-channel audio signal and it may be provided as a time-domain audio signal (e.g. such as linear PCM at a given number of bits per sample and a given sample rate) or as an encoded audio signal that has been encoded using an audio encoder known in the art. In a scenario where the input audio signal 101 comprises a respective encoded audio signal, the audio processing system 100 operates to decode the encoded audio signal into a respective time-domain audio signal using a corresponding audio decoder.

The spatial metadata 103 conveys information that defines at least some characteristics of spatial rending of the input audio signal 101, provided for example as a set of spatial audio parameters. The following description assumes that the spatial audio parameters comprise one or more sound direction parameters that define sound direction(s) in respective one or more frequency sub-bands and one or more energy ratio parameters that define a ratio of an energy of a directional sound component (or ratios of energies of multiple directional sound components) with respect to total energy at respective frequency sub-bands. This, however, is a non-limiting example chosen for editorial clarity of the description and in other examples a different set of spatial audio parameters that serve to convey information defining sound directions and/or the relationship between directional and diffuse sound components may be applied instead.

The parametric spatial audio signal defined by the input audio signal 101 and the spatial metadata 103 defines a spatial audio image that represents a sound scene that may contain one or more directional sounds in certain sound directions with respect to an assumed listening point together with ambient sounds and reverberation around the assumed listening point. In this regard, a directional sounds may represent, for example, a respective distinct sound sources in respective sound directions with respect to the assumed listening point. In other examples, a directional sound may represent reflection or reverberation, a combination of multiple distinct sound sources and/or an ambient sound around the assumed listening point. Consequently, a sound direction indicated in the spatial metadata for a certain frequency sub-band indicates a dominant sound direction in the certain frequency sub-band, while it does not necessarily indicate a direction (or even presence) of a distinct sound source in the certain frequency sub-band.

The at least one sound reproduction characteristic 105 comprises information that defines at least some characteristics of sound rendering capability of a device that implements the audio processing system 100 and/or those of another device that is intended for playback of the output audio signal 115. An example of information included in the at least one sound reproduction characteristic 105 is information derived based on acoustic measurements and/or acoustic simulations carried out on the device, such as (complex-valued) cross-talk cancelling gains for one or more frequency sub-bands, which measurements or simulations may, at least in part, rely on usage of a dummy head positioned at a typical listening (or viewing) distance with respect to the device, where the dummy head has respective microphones arranged in positions that correspond respective positions of ears. Further examples of information included in the at least one sound reproduction characteristic 105 include an indication of the number of loudspeakers in a device and loudspeaker positions of the device in relation to a reference position with respect to the device. Herein, the reference position refers to an assumed listening (or viewing) position of a user with respect to the device when listening to the sounds reproduced via speakers of the device (or watching visual content from a display of the device). The information that defines the loudspeaker positions may include, for each loudspeaker of the device, one or more of the following:

- A respective loudspeaker direction with respect to a reference direction (e.g. the assumed front direction), defined e.g. as respective loudspeaker angles $\propto_i$ with respect to the reference direction.
- A respective loudspeaker distance from the reference position with respect to the device.

As a non-limiting example in this regard, the at least one sound reproduction characteristic 105 may defined that the loudspeakers are positioned at loudspeaker angles $\propto_1=-15$ degrees and $\propto_2=15$ degrees with respect to the front direction at a reference point that is halfway between the loudspeakers at an assumed listening distance of 30 cm.

The output audio signal 115 may comprise an audio signal that, when reproduced via loudspeaker arrangement defined in the at least one sound reproduction characteristic 105, provides a listener (positioned at or approximately at the reference position with respect to the device) with a sound having binaural characteristics. On the other hand, if reproduced via headphones, reproduction of the output audio signal 115 does not provide the listener with a sound having appropriate binaural characteristics.

The audio processing system 100 enables processing the input audio signal 101 in accordance with the spatial metadata 103 so as to play back a spatial audio signal in a device in dependence of at least one sound reproduction characteristic 105 of the device. The processing carried out by the audio processing system 100 comprises rendering a first portion of the spatial audio signal using a first type playback procedure applied on the input audio signal 101 in dependence of the spatial metadata 103, wherein the first portion comprises sound directions within a front region, and rendering a second portion of the spatial audio signal using a second type playback procedure applied on the input audio signal 101 in dependence of the spatial metadata 103 and in dependence of said at least one sound reproduction characteristic 105, wherein the second portion comprises sound directions that are not included in the first portion and where the second type playback procedure is different from the first playback procedure and involves cross-talk cancellation processing.

According to a non-limiting example, the first type playback procedure may comprise or it may be based on an amplitude panning procedure. In other non-limiting examples, the first type playback procedure may comprise, instead of amplitude panning, e.g. delay panning, Ambisonics panning or any combination or sub-combination of amplitude panning, delay panning and Ambisonics panning. In contrast, either the first type playback procedure does not involve any cross-talk cancelling processing or the first type playback procedure may involve cross-talk cancellation processing that provides a substantially lesser cross-talk cancellation effect in comparison to that of the cross-talk cancellation processing involved in the second type playback procedure. In an example, the first type playback procedure may be carried out further in dependence of the at least one sound reproduction characteristic.

In the following, without losing generality, operation of the audio processing system is described via examples where the first type playback procedure involves amplitude panning procedure carried out further in dependence of the at least one sound reproduction characteristic. Each of the first and second type playback procedures may further involve respective one or more audio signal processing techniques. As non-limiting examples in this regard, the first type playback procedure may comprise audio equalization whereas the second type playback procedure may comprise binauralization, as described in more detail in the following examples.

As a brief overview, the audio processing system 100 according to the example illustrated in FIG. 1 comprises a transform entity (or a transformer) 102 for converting the input audio signal 101 from time domain into a transform domain audio signal 107, a signal decomposer 104 for deriving, based on the transform-domain audio signal 107, in dependence of the spatial metadata 103 and in dependence of the at least one sound reproduction characteristic 105, a first signal component 109-1 that represents a first portion of the spatial audio image and a second signal component 109-2 that represents a second portion of the spatial audio image, a first portion processor 106 for deriving, based on the first signal component 109-1 and in dependence of the at least one sound reproduction characteristic 105, a modified first signal component 111-1, a second portion processor 108 for deriving, based on the second signal component 109-2 and in dependence of the at least one sound reproduction characteristic 105, a modified second signal component 111-2, a signal combiner 110 for combining the modified first signal component 111-1 and the modified second signal component 111-2 into a transform-domain output audio signal 113 suitable for loudspeaker reproduction, and an inverse transform entity 112 for converting the transform-domain output audio signal 113 into the (time-domain) output audio signal 115 to serve as the output audio signal of the audio processing system 100.

In other examples, the audio processing system 100 may include further entities in addition to those illustrated in FIG. 1 and/or some of the entities depicted in FIG. 1 may combined with other entities while providing the same or corresponding functionality. In particular, the entities illustrated in FIG. 1 as well as those illustrated in subsequent FIGS. 2 to 4 serve to represent logical components of the audio processing system 100 that are arranged to perform a respective function but that do not impose structural limitations concerning implementation of the respective entity. Hence, for example, respective hardware means, respective software means or a respective combination of hardware means and software means may be applied to implement any of the entities illustrated in respective one of FIGS. 1 to 4 separately from the other entities, to implement any sub-combination of two or more entities illustrated in respective one of FIGS. 1 to 4, or to implement all entities illustrated in respective one of FIGS. 1 to 4 in combination.

The audio processing system 100 may be arranged to process the input audio signal 101 (in view of the spatial metadata 103) arranged into a sequence of input frames, each input frame including a respective segment of digital audio signal for each of the channels, provided as a respective time series of input samples at a predefined sampling frequency. In typical example, the audio processing system 100 employs a fixed predefined frame length. In other examples, the frame length may be a selectable frame length that may be selected from a plurality of predefined frame lengths, or the frame length may be an adjustable frame length that may be selected from a predefined range of frame lengths. A frame length may be defined as number samples L included in the frame for each channel of the input audio signal 101, which at the predefined sampling frequency maps to a corresponding duration in time. As an example in this regard, the audio processing system 100 may employ a fixed frame length of 20 milliseconds (ms), which at a sampling frequency of 8, 16, 32 or 48 kHz results in a frame of L=160, L=320, L=640 and L=960 samples per channel, respectively. The frames may be non-overlapping or they may be partially overlapping.

These values, however, serve as non-limiting examples and frame lengths and/or sampling frequencies different from these examples may be employed instead, depending e.g. on the desired audio bandwidth, on desired framing delay and/or on available processing capacity.

The audio processing system 100 may be implemented by one or more computing devices and the resulting output audio signal 115 may be provided for playback via loudspeakers of one of these devices. Typically, the audio processing system 100 is implemented in a portable handheld device such as a mobile phone, a media player device, a tablet computer, a laptop computer, etc. that is also applied to play back the output audio signal 115 via a pair of loudspeakers provided in the device. In another example, the audio processing system 100 is provided in a first device, whereas the playback of the output audio signal 115 is provided in a second device. In a further example, a first part of the audio processing system 100 is provided in a first device, whereas a second part of the audio processing system 100 and the playback of the output audio signal 115 is provided in a second device. In these two latter examples, the second device may comprise a portable handheld device such as a mobile phone, a media player device, a tablet computer, a laptop computer, etc. while the first device may comprise a computing device of any type, e.g. a portable handheld device, a desktop computer, a server device, etc.

Figure 2:
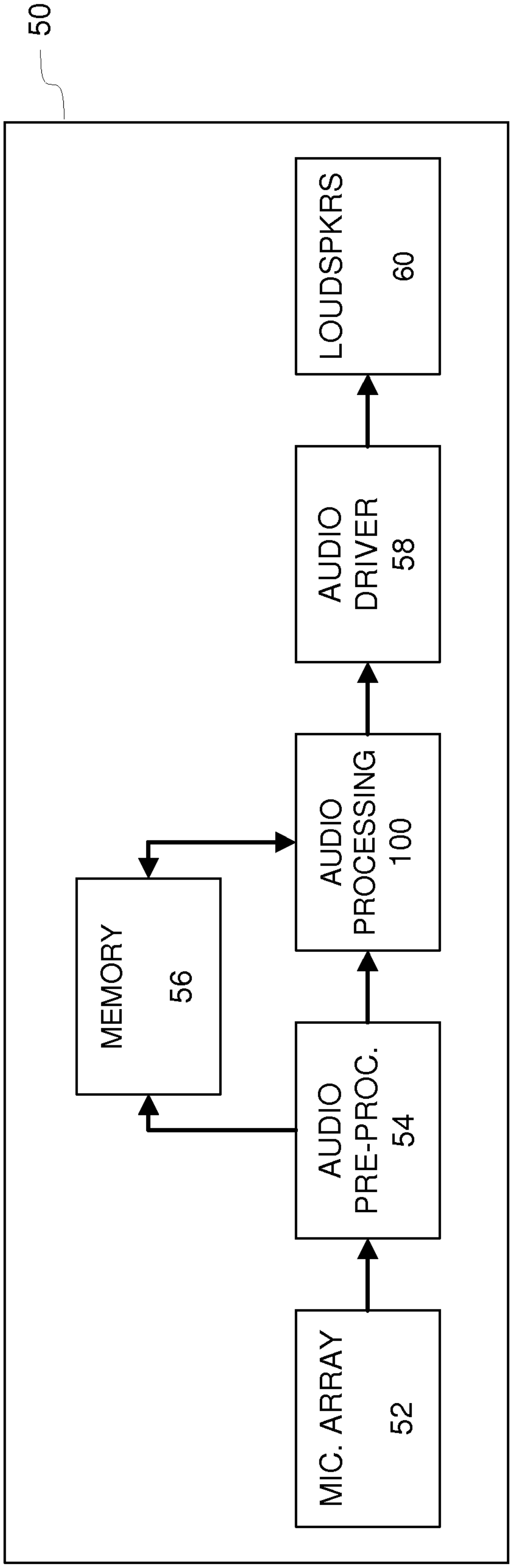
FIG. 2 illustrates a block diagram of some elements of a device that be applied to implement the audio processing system according to an example.

FIG. 2 illustrates a block diagram of some components and/or entities of a device 50 that may be applied to implement the audio processing system 100. The device 50 may be provided, for example, as a portable handheld device or as a mobile device of other kind. For brevity and clarity of description, in the following description referring to FIG. 2 it is assumed that the elements of the audio processing system 100 and the playback of the resulting output audio signal 115 are provided in the device 50. The device 50 further comprises a microphone array 52 comprising two or more microphones, an audio pre-processor 54 for processing respective microphone signals captured by the microphone array 52 into the parametric spatial audio signal comprising the input audio signal 101 and the spatial metadata 103, a memory 56 for storing information, e.g. the parametric spatial audio signal and the at least one sound reproduction characteristic 105, an audio driver 58 and a pair of loudspeakers 60, where the audio driver 58 is arranged for driving playback of the output audio signal 115 via the loudspeakers 60.

In the device 50, the audio processing system 100 may receive the parametric spatial audio signal (including the input audio signal 101 and the spatial metadata 103) and the at least one sound reproduction characteristic 105 by reading this information from the memory 56 provided in or coupled to the device 50. In another example, the device 50 may receive the parametric spatial audio signal and/or the at least one sound reproduction characteristic 105 via a communication interface (such as a network interface) from another device that stores one or both of these pieces of information in a memory provided therein. Instead of or in addition to providing the output audio signal 115 for playback via the audio driver 58 and the loudspeakers 60, the device 50 may be arranged to store the output audio signal 115 in the memory 56 and/or to provide the output audio signal 115 via the communication interface to another device for rendering and/or storage therein.

Referring back to FIG. 1, the transform entity 102 may be arranged to convert the input audio signal 101 from time domain into a transform-domain audio signal 107. Typically, the transform domain involves a frequency domain. In an example, the transform entity 102 employs short-time discrete Fourier transform (STFT) to convert each channel of the input audio signal 101 into a respective channel of the transform-domain audio signal 107 using a predefined analysis window length (e.g. 20 milliseconds). In another example, the transform entity 102 employs an (analysis) complex-modulated quadrature-mirror filter (QMF) bank for time-to-frequency-domain conversion. The STFT and QMF bank serve as non-limiting examples in this regard and in further examples any suitable transform technique known in the art may be employed for creating the transform-domain audio signal 107.

Part of the processing carried out by the audio processing system 100, for example at least some aspects of the processing carried out by the signal decomposer 104, may be carried out separately for a plurality of frequency sub-bands. Consequently, operation of the audio processing system 100 may comprise (at least conceptually) dividing or decomposing each channel of the transform-domain audio signal 107 into a plurality of frequency sub-bands, thereby providing a respective time-frequency representation for each channel of the input audio signal 101. According to non-limiting examples, if applicable, the (conceptual) division into the frequency sub-bands may be carried out by the transform entity 102 or by the signal decomposer 104.

A given frequency band in a given frame may be referred to as a time-frequency tile. The number of frequency sub-bands and respective bandwidths of the frequency sub-bands may be selected e.g. in accordance with the desired frequency resolution and/or available computing power. In an example, the sub-band structure involves 24 frequency sub-bands according to the Bark scale, an equivalent rectangular band (ERB) scale or $3^{rd}$ octave band scale known in the art.

In other examples, different number of frequency sub-bands that have the same or different bandwidths may be employed. A specific example in this regard is a single frequency sub-band that covers the input spectrum in its entirety or a single frequency sub-band that covers a continuous subset of the input spectrum.

A time-frequency tile that represents frequency bin b in time frame n of channel i of the transform-domain audio signal 107 may be denoted as x(i, b, n). The transform-domain audio signal 107, e.g. the time-frequency tiles x(i, b,n), are passed to the signal decomposer 104 for decomposition into the first signal component 109-1 and the second signal component 109-2 therein. As described in the foregoing, a plurality of consecutive frequency bins may be grouped into a frequency sub-band, thereby providing a plurality of frequency sub-bands k=0, . . . , K−1. For each frequency sub-band k, the lowest bin (i.e. a frequency bin that represents the lowest frequency in that frequency sub-band) may be denoted as $b_{k,low}$ and the highest bin (i.e. a frequency bin that represents the highest frequency in that frequency sub-band) may be denoted as $b_{k,high}$. In the following examples, usage of the STFT in the transform entity 102 is (implicitly) assumed. In such an example, the transform entity 102 may transform each frame n of the input audio signal 101 into a corresponding frame of the frequency-domain audio signal 107 that has one temporal sample (for each frequency bin b) per time frame. In other examples, a transform may result in multiple samples (for each frequency bin b) in the transform-domain audio signal 107 for each time frame.

Still referring to FIG. 1, the signal decomposer 104 may be arranged to derive, based on the transform-domain audio signal 107 and in dependence of the at least one sound reproduction characteristic 105, a first signal component 109-1 that represents a first portion of the spatial audio image and a second signal component 109-2 that represents a second portion of the spatial audio image. In this regard, the first portion may comprise a specified spatial portion or spatial region of the spatial audio image, whereas the second portion may represent one or more spatial portions or regions of the spatial audio image that do not include the specified spatial portion. In an example, the second portion may comprise the remainder of the spatial audio image, i.e. those parts of the spatial audio image that are not included in the first portion.

According to a non-limiting example, the first portion comprises sound directions within a front region of the spatial audio image whereas the second portion comprises sound directions that are not included in the first portion, e.g. those sound directions that are not included within the front region. Typically, but not necessarily, the second portion comprises a remainder region that involves those parts of the spatial audio image that are not included in the front region. The remainder region may be also referred to as a 'peripheral' region of the spatial audio image. Therefore, in context of this example, the first signal component 109-1 may be also referred to as a front region signal whereas the second signal component 109-2 may be also referred to as a remainder signal. Hence, the front region may represent those directional sounds of the spatial audio image that are within a predefined range of sound directions that define the front region in the spatial audio image, whereas the remainder region may represent directional sounds of the spatial audio image that are outside the predefined range together with ambient (non-directional) sounds of the spatial audio image.

In a non-limiting example, the first portion consists of the sound directions within the front region whereas the second portion does not include the sound directions within the front region but consists of sound directions outside the front region together with ambient sounds of the spatial audio image. A person skilled in the art readily appreciates, however, that due to necessary constraints imposed by a practical implementation of the signal decomposer 104 operating on real-world audio signals strict inclusion of only directional sounds within the front region in the first portion and/or strict exclusion of these sounds from the second portion may not be possible and hence in this non-limiting example the strict inclusion of only directional sounds within the front region in the first portion and strict exclusion of these directional sounds from the second portion rather recites the aim of the processing than the outcome of the processing across all real-life scenarios.

The signal decomposition procedure carried out by the signal decomposer 104 may comprise deriving the first signal component 109-1 based on the transform-domain audio signal 107 using an amplitude panning technique in view of the spatial metadata 103 and in view of the at least one sound reproduction characteristic 105 and deriving the second signal component 109-2 based on the transform-domain audio signal 107 using a binauralization technique in view of the spatial metadata 103 and in view of the at least one sound reproduction characteristic 105. Typically, the decomposition procedure results in each of the first signal component 109-1 and the second signal component 109-2 having a respective audio channel for each of the loudspeakers of the device implementing the audio processing system 100 (e.g. the loudspeakers 60 of the device 50). Hence, in case of processing the parametric spatial audio signal for playback by two loudspeakers, each of the first signal component 109-1 and the second signal component 109-2 have respective two audio channels, regardless of the number of channels of the transform-domain audio signal 107. Therein, according to an example, the two channels of the first signal component 109-1 may serve to convey a spatial sound where any directional sounds within the front region of the spatial audio image are arranged in respective sound directions via application of the amplitude panning technique, whereas the two channels of the second signal component 109-2 may serve to convey a binaural spatial sound including any directional sounds outside the front region together with any ambient sounds of the spatial audio image. The signal decomposer 104 provides the first signal component 109-1 to the first portion processor 106 for respective further processing therein in view of the at least one sound reproduction characteristic 105 and provides the second signal component 109-2 to the second portion processor 108 for respective further processing therein in view of the at least one sound reproduction characteristic 105.

Figure 3:
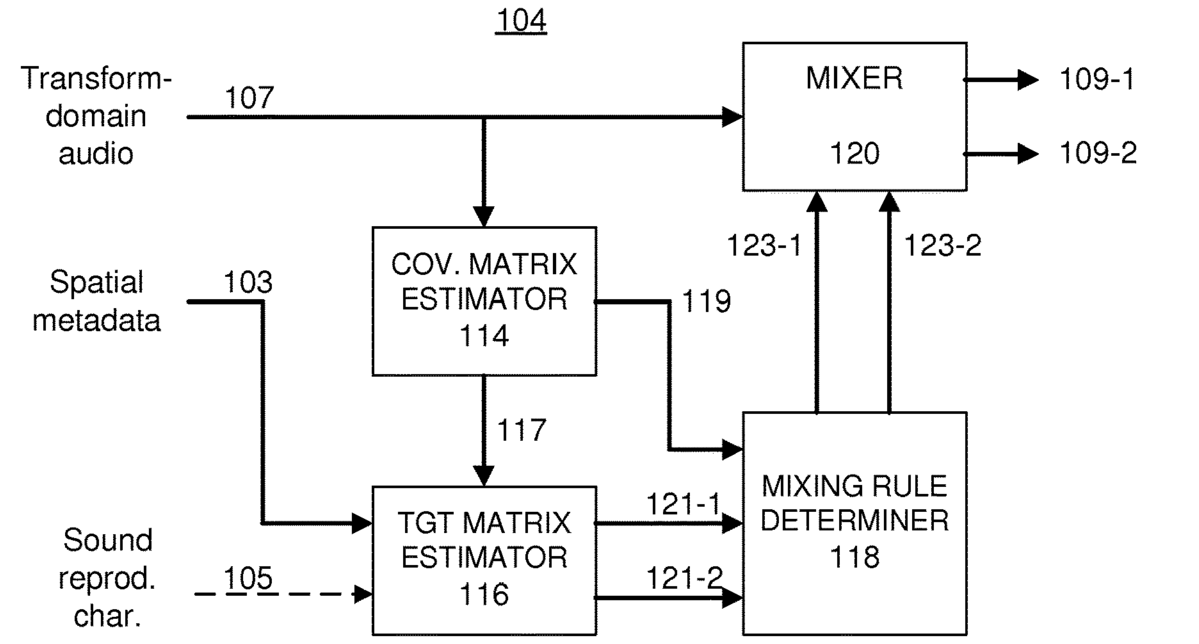
FIG. 3 illustrates a block diagram of some elements of a signal decomposer according to an example.

FIG. 3 illustrates a block diagram of some components and/or entities of the signal decomposer 104 according to an example, comprising a covariance matrix estimator 114 for deriving a covariance matrix 119 and an energy measure 117 based on the transform-domain audio signal 107, a target matrix estimator 116 for deriving a first target covariance matrix 121-1 and a second target covariance matrix 121-2 based on the spatial metadata 103 and the energy measure 117 in view of the at least one sound reproduction characteristic 105, wherein the first target covariance matrix 121-1 represents sounds included in the first portion of the spatial audio image and the second target covariance matrix 121-2 represents sounds included in the second portion of the spatial audio image, a mixing rule determiner 118 for deriving a first mixing matrix 123-1 and a second mixing matrix 123-2 based on the covariance matrix 119, the first target covariance matrix 121-1 and the second target covariance matrix 121-2, and a mixer 120 for deriving the first signal component 109-1 and the second signal component 109-2 based on the transform-domain audio signal 107 in view of the mixing matrices 123-1, 123-2. In the following, these (logical) entities of the signal decomposer 104 according to the example of FIG. 3 are described in more detail. In other examples, the signal decomposer 104 may include further entities and/or some entities depicted in FIG. 3 may be omitted or combined with other entities.

The covariance matrix estimator 114 is arranged to carry out covariance matrix estimation procedure that comprises deriving the covariance matrix 119 and the energy measure 117 based on the transform-domain audio signal 107. The covariance matrix estimator 114 provides the covariance matrix 119 for the mixing rule determiner 118 and provides the energy measure 117 for the target matrix estimator for respective further processing therein. Assuming a two-channel frequency-domain audio signal 107, it may be expressed in a vector from as $$x(b, n) = \begin{bmatrix} x(1, b, n) \\ x(2, b, n) \end{bmatrix}. \tag{1}$$

With this definition, according to an example, the covariance matrix 119 may be derived as $$C_x(k, n) = E\left[\sum_{b_{k,low}}^{b_{k,high}} x(b, n)x^H(b, n)\right], \tag{2}$$

where E[ ] denotes the expectation operator and H denotes Hermitian transpose. In an example, the expected value derivable via the expectation operator may be provided as an average over several (consecutive) time indices n, whereas in another example an instantaneous value of x(b, n) may be directly applied as the expected value without the need for temporal averaging over time indices n. The energy measure 117 may comprise, for example, an overall energy measure e(k,n) computed as a sum of the diagonal elements of the covariance matrix $C_x$ (k, n).

The target matrix estimator 116 may be arranged to derive the first target covariance matrix 121-1 and the second target covariance matrix 121-2 based on the spatial metadata 103 and the energy measure 117, possibly in view of the at least one sound reproduction characteristic 105. The target matrix estimator 116 provides the first and second target covariance matrices 121-1, 121-2 for the mixing rule determiner 118 for further processing therein. For clarity of description, an example that involves spatial audio parameters comprising one or more sound direction parameters that define respective sound directions in a horizontal plane for the one or more frequency sub-bands is described in the following. This readily generalizes into further examples that, additionally or alternatively, involve spatial audio parameters comprising one or more sound direction parameters that define respective elevation of sound directions for the one or more frequency sub-bands.

In the present example the spatial audio parameters included in the spatial metadata 103 comprise one or more azimuth angles θ(k, n) that serve as respective sound direction parameters for the one or more frequency sub-bands. In particular, the azimuth angle θ(k, n) denotes the azimuth angle with respect to a predefined reference sound direction (e.g. a direction directly in front of the assumed listening point) for the frequency sub-band k for the time index n. Moreover, in the present example the spatial audio parameters included in the spatial metadata 103 comprise one or more direct-to-total energy ratios r(k, n) that serve as respective energy ratio parameters for the one or more frequency sub-bands. In particular, the direct-to-total energy ratio r(k, n) denotes the ratio of the directional energy to the total energy at the frequency sub-band k for the time index n.

In this regard, the computation of the target covariance matrices 121-1, 121-2 may comprise determining an energy divisor value d(k, n) for the frequency sub-band k for the time index n based on the spatial metadata 103, e.g. such that the energy divisor value d(k, n) has value 1 for those time-frequency tiles for which a direction that is within the first portion of the spatial audio image (e.g. a sound direction that is within the range of sound directions that define the front region in the spatial audio image) is indicated and that has value 0 for other time-frequency tiles. According to a non-limiting example, the energy divisor value d(k, n) may be defined as $$d(k, n) = \begin{cases} 1, & |\theta(k, n)| < \theta_d \\ 0, & \text{otherwise} \end{cases}, \tag{3a}$$

where $\theta_d$ denotes an absolute value of an angle that defines the range of sound directions around a predefined reference direction (e.g. the front direction) that belong to the front region in the spatial audio image. Hence, the equation (3a) assumes a front region that is positioned symmetrically around the reference direction, spanning sound directions from $-\theta_d$ to $\theta_d$. In another example, the front region is not positioned symmetrically around the reference direction and the energy divisor value d(k, n) may be defined as $$d(k, n) = \begin{cases} 1, & \theta_{d1} < \theta(k, n) < \theta_{d2} \\ 0, & \text{otherwise} \end{cases}, \tag{3b}$$

where $\theta_{d1}$, $\theta_{d2}$ denote respective angles that define the range of sound directions with respect to the reference direction (e.g. the front direction) that belong to the front region of the spatial audio image.

According to an example, the angle $\theta_d$ or the angles $\theta_{d1}$, $\theta_{d2}$ may be derived, for example, based on the at least one sound reproduction characteristic 105. As a particular example, the angle $\theta_d$ or the angles $\theta_{d1}$, $\theta_{d2}$ may be derived based on the loudspeaker angles $\alpha_i$ defined in the at least one sound reproduction characteristic 105, e.g. such that $\theta_{d1}=\alpha_1$ and $\theta_{d2}=\alpha_2$. In another example, the angle $\theta_d$ or the angles $\theta_{d1}$, $\theta_{d2}$ may be included in the at least one sound reproduction characteristic 105. In a further example, the angle $\theta_d$ or the angles $\theta_{d1}$, $\theta_{d2}$ are predefined ones.

In general, the energy divisor value d(k,n) indicates an extent of inclusion of directional sound to the first portion of the spatial audio image. In this regard, the equations (3a) and (3b) serve to provide non-limiting example of providing the energy divisor value d(k,n) as a 'binary' value that indicates for the frequency sub-band k for the time index n one of inclusion in (e.g. d(k,n)=1) or exclusion from (e.g. d(k,n)=0) the first portion. In another example, the transition between the first and second portions of the spatial audio image may be made smooth e.g. by introducing transition ranges around the angle $\theta_d$ or the angles $\theta_{d1}$, $\theta_{d2}$, where the energy divisor value d(k,n) is set to a value 0<d(k,n)<1 such that energy divisor value decreases with increasing distance from the reference direction (e.g. the front direction). Consequently, for the frequency sub-band k for the time index n, the contribution of a directional sound having its sound direction within a transition range is divided between the first portion and the second portion in accordance with the energy divisor value d(k, n).

As described in the foregoing, the signal decomposition procedure carried out by the signal decomposer 104 may comprise deriving the first signal component 109-1 using an amplitude panning technique. Consequently, the computation of the first target covariance matrix 121-1 may further comprise determining a respective panning gain vector g(k, n) for each time-frequency tile based on the sound direction parameters defined for the respective time-frequency tile in the spatial metadata 103, where the panning gain vector g(k,n) comprises a respective panning gain for each of the channels of first signal component 109-1 to be subsequently derived by operation of the signal decomposer 104. In an example, this comprises determining a panning gain vector g(θ(k, n)) for the frequency sub-band k for the time index n based on the azimuth angle θ(k, n) defined for the respective time-frequency tile. In the present example, the panning gain vector g(θ(k,n)) comprises a 2×1 vector of respective real-valued gains, thereby providing respective gains for the left and right channels. Any amplitude panning technique known in the art may be employed in derivation of the panning gains g(k,n), for example vector-base amplitude panning (VBAP), tangent panning law or sine panning law.

With the knowledge of the energy value e(k, n), the energy divisor value d(k, n) and the panning gains g(k, n), the target matrix estimator 116 may proceed to derivation of the first target covariance matrix 121-1 based on the spatial audio parameters available in the spatial metadata, for example, as $$C_1(k,n)=g(k,n)g^T(k,n)d(k,n)r(k,n)e(k,n). \tag{4}$$

Hence, the first target covariance matrix $C_1$(k,n) according to the equation (4) represents those directional sounds that are included in the first portion of the spatial audio image (e.g. in the front region of the spatial audio image).

Along the lines described in the foregoing, the signal decomposition procedure carried out by the signal decomposer 104 may comprise deriving the second signal component 109-2 as a binaural audio signal using a binauralization technique, for example as described in the following. Consequently, as an example, the computation of the second target covariance matrix 121-2 may comprise determining a respective head-related transfer function (HRTF) vector h(k,n) for each time-frequency tile based on the sound direction parameters defined for the respective time-frequency tile in the spatial metadata 103. In an example, this comprises determining a HRTF vector h(k, θ(k, n)) for the frequency sub-band k for the time index n based on the azimuth angle θ(k, n) defined for the respective time-frequency tile, the HRTF vector h(k, θ(k, n)) thereby comprising a 2×1 vector of respective complex-valued gains and providing respective gains for the left and right channels. The HRTF vector h(k, n) may be obtained, for example, from a database of HRTFs stored in the memory of the device implementing the audio processing system 100 (e.g. in the memory 56 of the device 50).

Derivation of the second target covariance matrix 121-2 may further comprise obtaining a diffuse field covariance matrix $C_d$(k), which may be predefined by assuming a set of sound direction values $\theta_m$ (preferably substantially evenly) spanning over a predefined range of sound directions, where m=1, . . . , M as $$C_d(k) = \frac{1}{N}\sum_{m=1}^{M} h(k, \theta_m)h^H(k, \theta_m). \tag{5}$$

Herein, the set of sound direction values $\theta_m$ may comprise, for example, from 20 to 60 sound directions that are (pseudo-)evenly spaced to cover a desired spatial portion of a 3D space, thereby modeling responses from all directions of the desired spatial portion of the 3D space. As described in the foregoing, the diffuse field covariance matrix $C_d$(k) may be precomputed, for example, according to the equation (5) and provided to the signal decomposer 104 for derivation of the second target covariance matrix 121-2.

Consequently, the second target covariance matrix 121-2 may be obtained, for example, as $$C_2(k,n)=r(k,n)h(k,n)h^H(k,n)(1-d(k,n))e(k,n)+(1-r(k,n))C_d(k)e(k,n). \tag{6}$$

Hence, the second target covariance matrix $C_2$(k,n) according to the equation (6) represents those directional sounds that are included in the second portion of the spatial audio image (e.g. in the remainder region of the spatial audio image) together with non-directional (ambient) sounds of the spatial audio image.

The mixing rule determiner 118 may be arranged to derive the first mixing matrix 123-1 and the second mixing matrix 123-2 based on the covariance matrix 119, the first target covariance matrix 121-1 and the second target covariance matrix 121-2, and to provide the first and second mixing matrices 123-1, 123-2 to the mixer 120 for further processing therein. Mixing rule determination procedure carried out by the mixing rule determiner 118 may comprise deriving the first mixing matrix 123-1 based on the covariance matrix 119 and the first target covariance matrix 121-1 and deriving the second mixing matrix 123-2 based on the covariance matrix 119 and the second target covariance matrix 121-2. As an example, respective derivation of the first mixing matrix 123-1 and the second mixing matrix 123-2 may be carried out as described in [6].

In particular, the formula provided in an appendix of [6] may be employed to derive, based on the covariance matrix 119 (e.g. the covariance matrix $C_x$(k, n)) and the first target covariance matrix 121-1 (e.g. the target covariance matrix $C_1$(k, n)), a mixing matrix $M_1$(k, n) for the frequency sub-band k for the time index n, which may serve as the first mixing matrix 123-1 for the respective time-frequency tile for deriving a corresponding time-frequency tile of the first signal component 109-1 such that it has a covariance matrix that is the same or similar to the first target covariance matrix 121-1. Along similar lines, the procedure of [6] may be applied to derive, based on the covariance matrix 119 (e.g. the covariance matrix $C_x$(k, n)) and the second target covariance matrix 121-2 (e.g. the target covariance matrix $C_2$(k, n)) a mixing matrix $M_2$(k, n) for the frequency sub-band k for the time index n, which may serve as the second mixing matrix 123-2 for the respective time-frequency tile for deriving a corresponding time-frequency tile of the second signal component 109-2 such that it has a covariance matrix that is the same or similar to the second target covariance matrix 121-2.

For the purpose of this derivation, a prototype matrix Q is defined for guiding generation of the mixing matrices $M_1(k, n)$ and $M_2(k, n)$ according to the procedure described in detail in [6]:

$$Q = \begin{bmatrix} 1 & 0 \\ 0 & 1 \end{bmatrix}. \tag{7}$$

The procedure explained in full detail in [6] is applicable for deriving the mixing matrix $M_1(k, n)$ on basis of the covariance matrix $C_x(k, n)$ and the first target covariance matrix $C_1(k, n)$ such that when the mixing matrix $M_1(k, n)$ is applied to a signal having the covariance matrix $C_x(k, n)$, the resulting processed signal approximates, in a least-squared optimized manner, one that has covariance matrix $C_1(k, n)$. Along similar lines, this procedure may be applied to derive the mixing matrix $M_2(k, n)$ that, when applied to a signal having the covariance matrix $C_x(k, n)$, results in a processed signal that in the least-squared sense optimized sense approximates one that has the covariance matrix $C_2(k, n)$. Consequently, the mixing matrix $M_1(k, n)$ serving as the first mixing matrix 123-1 is provided for deriving the first signal component 109-1 based on the transform domain audio signal 107, whereas the mixing matrix $M_2(k,n)$ serving as the second mixing matrix 123-2 is provided for deriving the second signal component 109-2 based on the transform domain audio signal 107. Herein, the prototype matrix Q is provided as an identity matrix in order to make the signal content in channels of the first and second signal components 109-1, 109-2 to resemble that of the respective channels of transform-domain audio signal 107 (and, consequently, that of the respective channels of the input audio signal 101).

The mixer 120 may be arranged to derive the first signal component 109-1 and the second signal component 109-2 based on the transform-domain audio signal 107 in view of the mixing matrices 123-1, 123-2, and to provide the first and second signal components 109-1, 109-2, respectively, to the first portion processor 106 and the second portion processor 108 for further processing therein.

The mixing procedure carried out by the mixer 120 may comprise deriving the first signal component as a product of the first mixing matrix 123-1 and the transform-domain audio signal 107, e.g. as $$\begin{bmatrix} x(1, b, n) \\ x(2, b, n) \end{bmatrix} = M_1(k, n)x(b, n), \tag{8a}$$

where k denotes the frequency sub-band in which the frequency bin b resides and where $x_1(1, b, n)$ and $x_1(2, b, n)$ denote the left and right channels of the first signal component 109-1, respectively. Along similar lines, the mixing procedure may comprise deriving the second signal component as a product of the second mixing matrix 123-2 and the transform-domain audio signal 107, e.g. as $$\begin{bmatrix} x_2(1, b, n) \\ x_2(2, b, n) \end{bmatrix} = M_2(k, n)x(b, n), \tag{8b}$$

where $x_2(1, b, n)$ and $x_2(2, b, n)$ denote the left and right channels of the second signal component 109-2, respectively.

While the above examples provided in the equations (8a) and (8b) apply the first and second mixing matrices $M_1(k, n)$ and $M_2(k, n)$ as such, in another example one or both of the mixing matrices $M_1(k, n)$ and $M_2(k, n)$ may be subjected to temporal smoothing (such as averaging over a predefined number of frames, e.g. four frames) before their application for generating the first and second signal components 109-1, 109-2.

Referring now back to FIG. 1, the first portion processor 106 may be arranged to derive the modified first signal component 111-1, based on the first signal component 109-1 and in dependence of the at least one sound reproduction characteristic 105 and to provide the modified first signal component 111-1 to the signal combiner 110 for further processing therein. In this regard, the first portion processor 106 may be arranged to apply a set of equalization gains to derive the modified first signal component 111-1 based on the first signal component 109-1, e.g. as $$x'_1(i,b,n)=g_{EQ}(i,k)x_1(i,b,n), \tag{9}$$

where $x'_1(i, b, n)$ denotes the modified first signal component 111-1 for frequency bin b for time index n in channel i (derived e.g. according to the equation (8a) above) and $g_{EQ}(i,k)$ denotes the equalization gain for channel i in the frequency sub-band k in which the frequency bin b resides. Hence, for each channel i, the equation (9) applies the respective equalization gain $g_{EQ}(i,k)$ defined for the frequency sub-band k for each frequency bin b of that frequency sub-band, thereby resulting equalization gains that may be different as a function of the frequency sub-band k and channel i.

The equalization gains $g_{EQ}(i, k)$ may comprise respective predefined gain values that reflect characteristics of a device (e.g. the device 50) implementing the audio processing system 100. According to an example, the equalization gains $g_{EQ}(i,k)$ may comprise respective predefined gain values provided as part of the at least one sound reproduction characteristic 105. In another example, the at least one sound reproduction characteristic 105 may comprise respective gains that may be used as basis for deriving the equalization gains $g_{EQ}(i,k)$ and/or the at least one sound reproduction characteristic 105 may comprise equalization information of other type that enables deriving the equalization gains $g_{EQ}(i,k)$.

According to an example, the equalization gains $g_{EQ}(i,k)$ may have been obtained on experimental basis, e.g. by recording test signals using a microphone positioned at the reference position with respect to a device (e.g. the device 50) implementing the audio processing system 100 and deriving the equalization gains $g_{EQ}(i,k)$ such that they equalize the spectrum of the test signals to a desired degree. In an example, the equalization gains $g_{EQ}(i, k)$ are set such that undue amplification of spectral portions where the signal level is relatively low is avoided. In another example, additionally or alternatively, at least some of the equalization gains $g_{EQ}(i,k)$ may be set to unity or a value that is close to unity.

The equalization gains $g_{EQ}(i, k)$ aim at equalizing the responses of the loudspeakers of a device in order to make the timbre of the sound less colored, while at the same time possibly different equalization gains $g_{EQ}(i, k)$ provided for the channels i of the first signal component 109-1 aim at mitigating differences in respective responses of the loudspeakers. Consequently, application of the equalization gains $g_{EQ}(i, k)$ may serve to ensure that directional sounds of the spatial audio image conveyed by the parametric spatial audio signal provided as input to the audio processing system 100 appear in the reproduced spatial audio image in their respective intended sound directions, thereby improving spatial characteristics of the output audio signal 115.

In an example, the first portion processor 106 is arranged to delay the modified first signal component 111-1 by a predefined time delay in order to temporally align the modified first signal component 111-1 with the modified second signal component 111-2. Hence, if the delay is applied, the predefined time delay is selected such that it matches or substantially matches the delay resulting from procedure carried out by the second portion processor 108. In an example, the time delay may be applied to the first signal component 109-1 before carrying out the equalization procedure e.g. according to the equation (9), whereas in another example the time delay may be applied to the modified first signal component 111-1 obtained e.g. by the equation (9) before providing the signal for the signal combiner 110.

Still referring to FIG. 1, the second portion processor 108 may be arranged to derive the modified second signal component 111-1, based on the second signal component 109-2 and in dependence of the at least one sound reproduction characteristic 105 and to provide the modified second signal component 111-2 to the signal combiner 110 for further processing therein. In this regard, the at least one sound reproduction characteristic 105 may comprise information that specifies respective acoustic propagation characteristics from each of the loudspeaker of a device implementing the audio processing system 100 (e.g. the loudspeakers 60 of the device 50). The processing carried out by the second portion processor 108 serves to carry out cross-talk cancellation procedure for the second signal component 109-2. In this regard, the second signal component 109-2 obtained from the signal decomposer 104 may be provided as a binaural signal derived according to the equation (8b). Consequently, the left channel of the second signal component 109-2 is intended for playback to the left ear of a listener, whereas the right channel of the second signal component 109-2 is intended for playback to the right ear of the listener. The cross-talk cancellation procedure carried out by the second spatial processor 108 aims at providing the modified second signal component 111-2 as an audio signal where 'leakage' of the audio signal content from the left channel of the second signal component 109-2 to the right ear of the listener positioned in the reference position with respect to the device is reduced (e.g. substantially eliminated) and, vice versa, where 'leakage' of the audio signal content from the right channel of the second signal component 109-2 to the left ear of the listener positioned in the reference position with respect to the device is reduced (e.g. substantially eliminated). Consequently, spatial characteristics arising from the audio content conveyed by the modified second signal component 111-2 when played back via the loudspeakers are substantially similar to those that would be acquired via (binaural) headphone listening of the second signal component 109-2, thereby enabling spatial audio reproduction at high quality via the loudspeakers.

Figure 4:
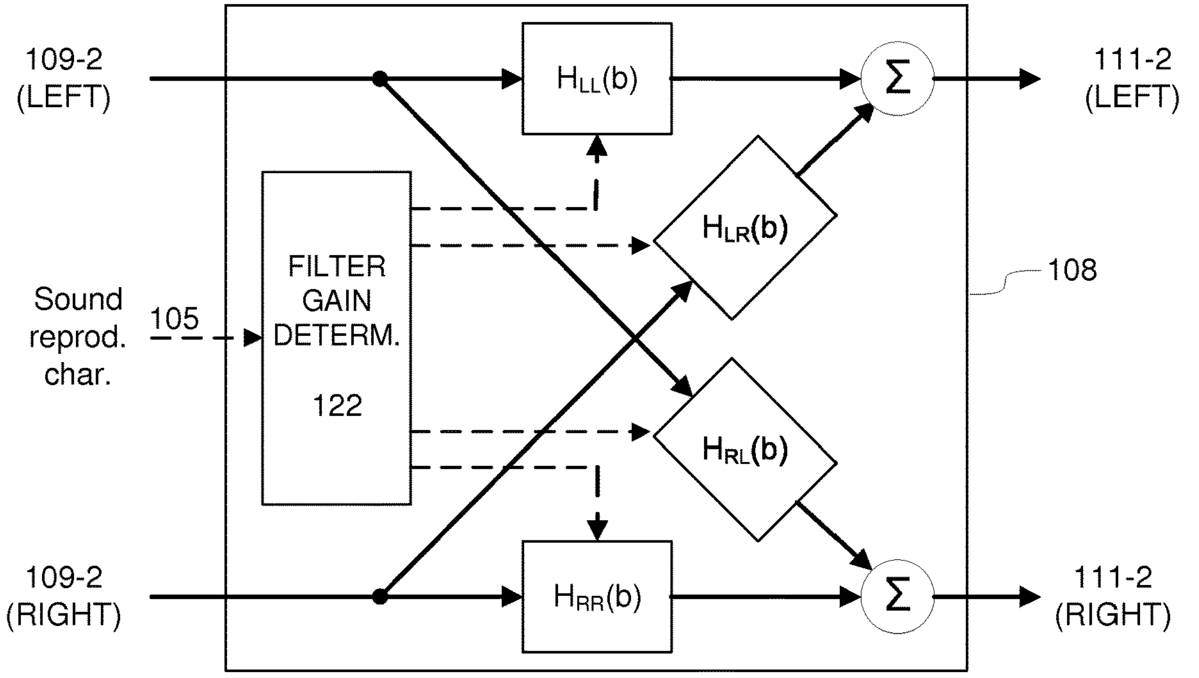
FIG. 4 illustrates a block diagram of some elements of a spatial portion processor according to an example.

FIG. 4 illustrates a block diagram of some components and/or entities of the second portion processor 108 according to an example, comprising filtering gains $H_{LL}$(b), $H_{RL}$(b), $H_{LR}$(b) and $H_{RR}$(b) and a filter gain determiner 122 for deriving respective filtering gains $H_{LL}$ (b), $H_{RL}$(b), $H_{LR}$(b) and $H_{RR}$(b). The filtering gains $H_{u}$ (b), $H_{RL}$(b), $H_{LR}$(b) and $H_{RR}$(b) may be also denoted as cross-talk cancelling gains or cross-talk cancelling filters, which may be provided as respective complex-valued gains for a plurality of frequency bins b (e.g. for all frequency bins b). The filtering gains $H_{LL}$ (b), $H_{RL}$(b), $H_{LR}$(b) and $H_{RR}$(b) are typically based at least in part on measurements carried out for the loudspeakers of a device implementing the audio processing system 100 and, consequently, they may further account, at least to some extent, for device-specific equalization of the loudspeakers.

The second portion processor 108 may be arranged to create the left channel of the modified second signal component 111-1 as a sum of the left channel of the second signal component 109-2 multiplied by the filtering gain $H_{LL}$(b) and the right channel of the second signal component 109-2 multiplied by the filtering gain $H_{LR}$(b) and to create the right channel of the modified second signal component 111-2 as a sum of the left channel of the second signal component 109-2 multiplied by the filtering gain $H_{RL}$(b) and the right channel of the second signal component 109-2 multiplied by the filtering gain $H_{RR}$(b). Herein, the left and right channels of the second signal component 109-2 may comprise, respectively, $x_2$ (1, b, n) and $x_2$ (2, b, n) derived e.g. according to the equation (8b), whereas the left and right channels of the modified second signal component 111-2 in channel i for the frequency bin b for the time index n may be denoted as $x'_2$(i, b, n).

According to an example, respective gains for the filtering gains $H_{LL}$(b), $H_{RL}$(b), $H_{LR}$(b) and $H_{RR}$(b) are predefined ones, provided as part of the at least one sound reproduction characteristic 105, whereas the filter gain determiner 122 may hence be configured to read the filtering gain from the memory in the device implementing the audio processing system 100 and to provide the filtering gains for use as the filtering gains $H_{LL}$ (b), $H_{RL}$(b), $H_{LR}$(b) and $H_{RR}$(b) to implement the cross-talk cancellation filtering.

According to another example, the at least one sound reproduction characteristic 105 comprises, for each of the loudspeakers, a respective transfer function from the respective loudspeaker to the left ear of a user and to the right ear of the user positioned in the reference position with respect to the device implementing the audio processing system 100, whereas the filter coefficient determiner 122 may be arranged to derive the respective filtering gains $H_{LL}$(b), $H_{RL}$(b), $H_{LR}$(b) and $H_{RR}$(b) based on the reference frequency responses obtained in the at least one sound reproduction characteristic 105. As a non-limiting example in this regard, the filter gain determiner 122 may be arranged to derive the respective filtering gains $H_{LL}$(b), $H_{RL}$(b), $H_{LR}$(b) and $H_{RR}$(b) according to a technique described in [4]. An overview of this technique is provided in the following.

According to [4], the filtering gains for the frequency bin b may derived as $$H(b)=(D(b)^H D(b)+\beta I)^{-1} D(b)^H A(b). \tag{10}$$

where H(b) denotes a 2×2 matrix of complex-valued filtering gains in the transform domain, D(b) denotes a 2×2 matrix of transfer functions obtained as part of the at least one sound reproduction characteristic 105, β denotes a real-valued scalar regularization coefficient, I denotes a 2×2 identity matrix, and A(b) denotes a 2×2 matrix of target transfer functions. The equation (10) may be 'expanded' into $$\begin{bmatrix} H_{LL}(b) & H_{LR}(b) \\ H_{RL}(b) & H_{RR}(b) \end{bmatrix} = \left( \begin{bmatrix} D_{LL}(b) & D_{RL}(b) \\ D_{LR}(b) & D_{RR}(b) \end{bmatrix}^H \begin{bmatrix} D_{LL}(b) & D_{RL}(b) \\ D_{LR}(b) & D_{RR}(b) \end{bmatrix} + \beta \begin{bmatrix} 1 & 0 \\ 0 & 1 \end{bmatrix} \right)^{-1} \begin{bmatrix} D_{LL}(b) & D_{RL}(b) \\ D_{LR}(b) & D_{RR}(b) \end{bmatrix}^H \begin{bmatrix} A_{LL}(b) & A_{RL}(b) \\ A_{LR}(b) & A_{RR}(b) \end{bmatrix}, \tag{11}$$

where $D_{LL}(b)$ denotes the reference transfer function from the left speaker to the left ear, $D_{LR}(b)$ denotes the reference transfer function from the left speaker to the right ear, $D_{RL}(b)$ denotes the reference transfer function from the right speaker to the left ear, $D_{RR}(b)$ denotes the reference transfer function from the right speaker to the right ear, $A_{LL}(b)$ denotes the target transfer function from the left speaker to the left ear, $A_{LR}(b)$ denotes the target transfer function from the left speaker to the right ear, $A_{RL}(b)$ denotes the target transfer function from the right speaker to the left ear, and $A_{RR}(b)$ denotes the transfer function from the right speaker to the right ear.

As described in the foregoing, the transfer functions $D_{LL}(b)$, $D_{RL}(b)$, $D_{LR}(b)$ and $D_{RR}(b)$ are available in the at least one sound reproduction characteristic 105 and they may be obtained based on experimental data, e.g. via a procedure that involves recording test signals using a microphone arrangement positioned at the reference position with respect to a device (e.g. the device 50) implementing the audio processing system 100 and deriving the transfer functions $D_{LL}(b)$, $D_{RL}(b)$, $D_{LR}(b)$ and $D_{RR}(b)$ based on respective test recorded test signals, e.g. as an average or another linear combination of a plurality of recorded test signals corresponding to the respective one of the transfer functions $D_{LL}(b)$, $D_{RL}(b)$, $D_{LR}(b)$ and $D_{RR}(b)$. Herein, the respective test signals for each of the transfer functions $D_{LL}(b)$, $D_{RL}(b)$, $D_{LR}(b)$ and $D_{RR}(b)$ may be recorded by slightly varying the position and/or orientation of microphone applied to capture the test signals in order to account for small differences in orientation and/or posture of the user with respect to the device. The microphone arrangement referred to in the foregoing may comprise, for example, a dummy head positioned at the reference position with respect to the device, where the dummy head has respective microphones arranged in positions that correspond respective positions of ears.

According to a non-limiting example, for cross-talk cancellation the second portion processor 108 may arranged to set the target transfer function from the left speaker to the left ear $A_{LL}(b)$ equal to the reference transfer function from the left speaker to the left ear $D_{LL}(b)$, i.e. $A_{LL}(b)=D_{LL}(b)$, and to set the target transfer function from the right speaker to the right ear $A_{RR}(b)$ equal to the reference transfer function from the right speaker to the right ear $D_{RR}(b)$, i.e. $A_{RR}(b)=D_{RR}(b)$. In another example, the second portion processor 108 may provide the cross-talk cancellation by setting each of the target transfer function from the left speaker to the left ear $A_{LL}(b)$ and the target transfer function from the right speaker to the right ear $A_{RR}(b)$ equal to unity, i.e. $A_{LL}(b)=A_{RR}(b)=1$. In order to provide a cross-talk cancellation effect, the magnitude of the target transfer function from the left speaker to the right ear $A_{LR}(b)$ is set to be less than the magnitude of the reference transfer function from the left speaker to the right ear $D_{LR}(b)$ and/or the magnitude of the target transfer function from the right speaker to the left ear $A_{RL}(b)$ is set to be less than the magnitude of the reference transfer function from the right speaker to the left ear $D_{RL}(b)$, e.g. such that $|A_{LR}(b)|<|D_{LR}(b)|$ and/or $|A_{RL}(b)|<|D_{RL}(b)|$. In a non-limiting example, this may be accomplished via setting the target transfer function from the left speaker to the right ear $A_{LR}(b)$ according to $A_{LR}(b)=g_{LR}D_{LR}(b)$ and/or setting the target transfer function from the right speaker to the left ear $A_{RL}(b)$ according to $A_{RL}(b)=g_{RR}D_{RL}(b)$, where $0\leq g_{LR}<1$ and/or $0\leq g_{RL}<1$, at least on some frequency sub-bands b. As an example, the second portion processor 108 may be arranged to set each of the target transfer function from the left speaker to the right ear $A_{LR}(b)$ and the target transfer function from the right speaker to the left ear $A_{RL}(b)$ equal to zero, i.e. $A_{LR}(b)=A_{RL}(b)=0$.

Still referring to the equations (10) and (11), according to an example the regularization coefficient β may be set to a predefined constant value that is the same across the frequency bins b. In another example, the regularization coefficient β may be set to a predefined frequency-dependent value that may be different across the frequency bins b, e.g. according to a predefined function of frequency, thereby enabling cross-talk cancellation that avoids strong increases in signal level (e.g. 'boosts') or reductions in signal level (e.g. 'cuts') in certain frequency range(s) of the respective frequency responses resulting from application of the filtering gains $H_{u}(b)$, $H_{RL}(b)$, $H_{LR}(b)$ and $H_{RR}(b)$. In such a scenario, the constant regularization coefficient β in the equation (10) may be replaced with a frequency-bin-dependent regularization coefficient β(b), which has a relatively high value for frequencies at which application of the filtering gains $H_{LL}(b)$, $H_{RL}(b)$, $H_{LR}(b)$ and $H_{RR}(b)$ result in excess changes in signal level (e.g. 'boosts' or 'cuts') and which has a relatively low value for frequencies at which application of the filtering gains $H_{LL}(b)$, $H_{RL}(b)$, $H_{LR}(b)$ and $H_{RR}(b)$ do not result in excess changes in signal level (e.g. 'boosts' or 'cuts').

Referring back to FIG. 1, the signal combiner 110 may be arranged to combine the modified first signal component 111-1 and the modified second signal component 111-2 into the transform-domain output audio signal 113 suitable for loudspeaker reproduction and to provide the transform-domain output audio signal 113 to the inverse transform entity 112 for further processing therein. As examples in this regard, the transform-domain output audio signal 113 may be derived in the signal combiner 112 as a sum, as an average or as another linear combination of the modified first signal component 111-1 and the modified second signal component 111-2.

Still referring to FIG. 1, the inverse transform entity 112 may be arranged to convert the transform-domain output audio signal 113 into the (time-domain) output audio signal 115 and to provide the output audio signal 115 as the output audio signal of the audio processing system 100. In this regard, the inverse transform entity 112 is arranged to make use of an applicable inverse transform that inverts the time-to-transform-domain conversion carried out in the transform entity 102. As non-limiting examples in this regard, the inverse transform entity 112 may apply an inverse STFT or a (synthesis) QMF bank to provide the inverse transform.

Figure 5:
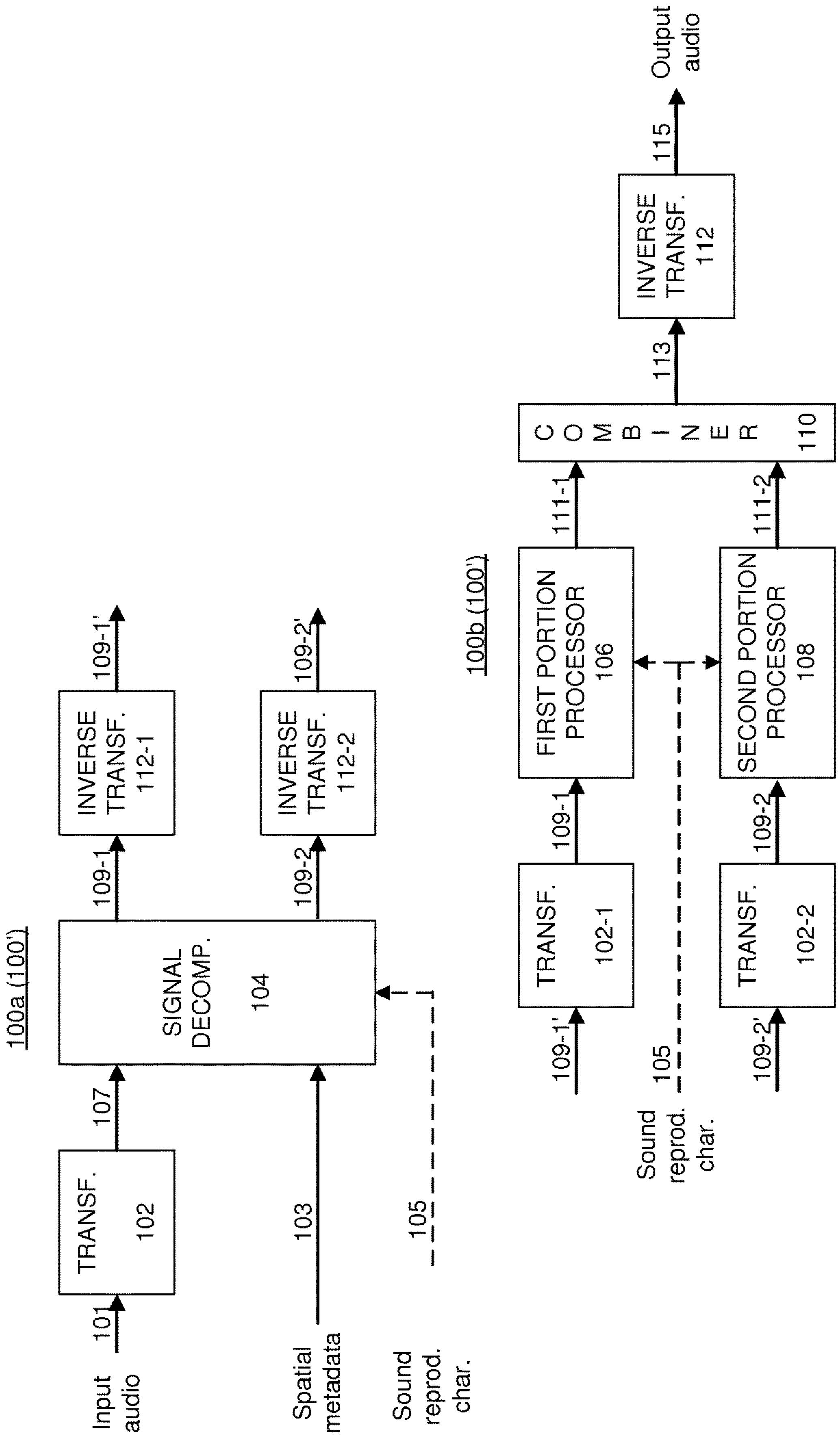
FIG. 5 illustrates a block diagram of some elements of an audio processing system according to an example.

FIG. 5 illustrates a block diagram of some components and/or entities of an audio processing system 100' that may serve as framework for various embodiments of the audio processing technique described in the present disclosure. The audio processing system 100' is a variation of the audio processing system 100 described in the foregoing via a plurality of non-limiting examples and hence its operation is described herein only to extent it differs from that of the audio processing system 100. The audio processing system 100' comprises a first subsystem **100*a* and a second subsystem 100*b*, which may be provided and/or operated separately from each other. In this regard, the first and second subsystems 100*a*, 100*b* may be implemented in the same device (e.g. the device 50**) or they may be implemented in separate devices.

The first subsystem **100*a* comprises the transform entity 101 and the signal decomposer 104, each arranged to operate as described in the foregoing in context of the audio processing system 100. The first subsystem 100*a* further comprises a first inverse transform entity 112-1 for converting the first signal component 109-1 from the transform domain to the time domain, thereby providing a time-domain first signal component 109-1', and an inverse transform entity 112-2 for converting the second signal component 109-2 from the transform domain to the time domain, thereby providing a time-domain second signal component 109-2'. Each of the inverse transform entities 112-1, 112-2 are arranged to operate in a manner described in the foregoing in context of the inverse transform entity 112**, mutatis mutandis.

Along the lines described in the foregoing for the audio processing system 100, in case of applying the audio processing system 100' for processing the parametric spatial audio signal for playback by two loudspeakers, each of the first signal component 109-1' and the second signal component 109-2' have respective two audio channels, regardless of the number of channels of the transform-domain audio signal 107. Therein, according to an example, the two channels of the first signal component 109-1' may serve to convey a spatial sound where any directional sounds within the front region of the spatial audio image are arranged in respective sound directions via application of the amplitude panning technique, whereas the two channels of the second signal component 109-2' may serve to convey a binaural spatial sound including any directional sounds outside the front region together with any ambient sounds of the spatial audio image.

A device implementing the first subsystem 100*a* may be further arranged to transfer the first and second signal components 109-1', 109-2' to the second subsystem 100*b* for further processing therein. The first and second signal components 109-1', 109-2' may be accompanied by an audio format indicator that serves to identify the first and second signal components 109-1', 109-2' as ones originating from the first subsystem 100*a*. The transfer from the first subsystem 100*a* to the second subsystem 100*b* may comprise, for example, the device implementing the first subsystem 100*a* arranged to transmit this information over a communication network or a communication channel to a device implementing the second subsystem 100*b* and/or the device implementing the first subsystem 100*a* arranged to store the information into a memory that is subsequently readable by the second subsystem 100*b*.

Consequently, the device implementing the second subsystem 100*b* may be arranged to receive the first and second signal components 109-1', 109-2' over a network interface or read the first and second signal components 109-1', 109-2' from a memory. The second subsystem 100*b* comprises a first transform entity 102-1 for converting the first signal component 109-1' from the time domain to the transform domain, thereby restoring the frequency-domain first signal component 109-1, and a second transform entity 102-2 for converting the second signal component 109-2' from the time domain to the transform domain, thereby restoring the frequency-domain second signal component 109-2. Each of the transform entities 102-1, 102-2 are arranged to operate in a manner described in the foregoing in context of the transform entity 102, mutatis mutandis. The second subsystem 100*b* further comprises the first portion processor 106, the second portion processor 108, the combiner 110 and the transform entity 112, each arranged to operate as described in the foregoing in context of the audio processing system 100.

Figure 6:
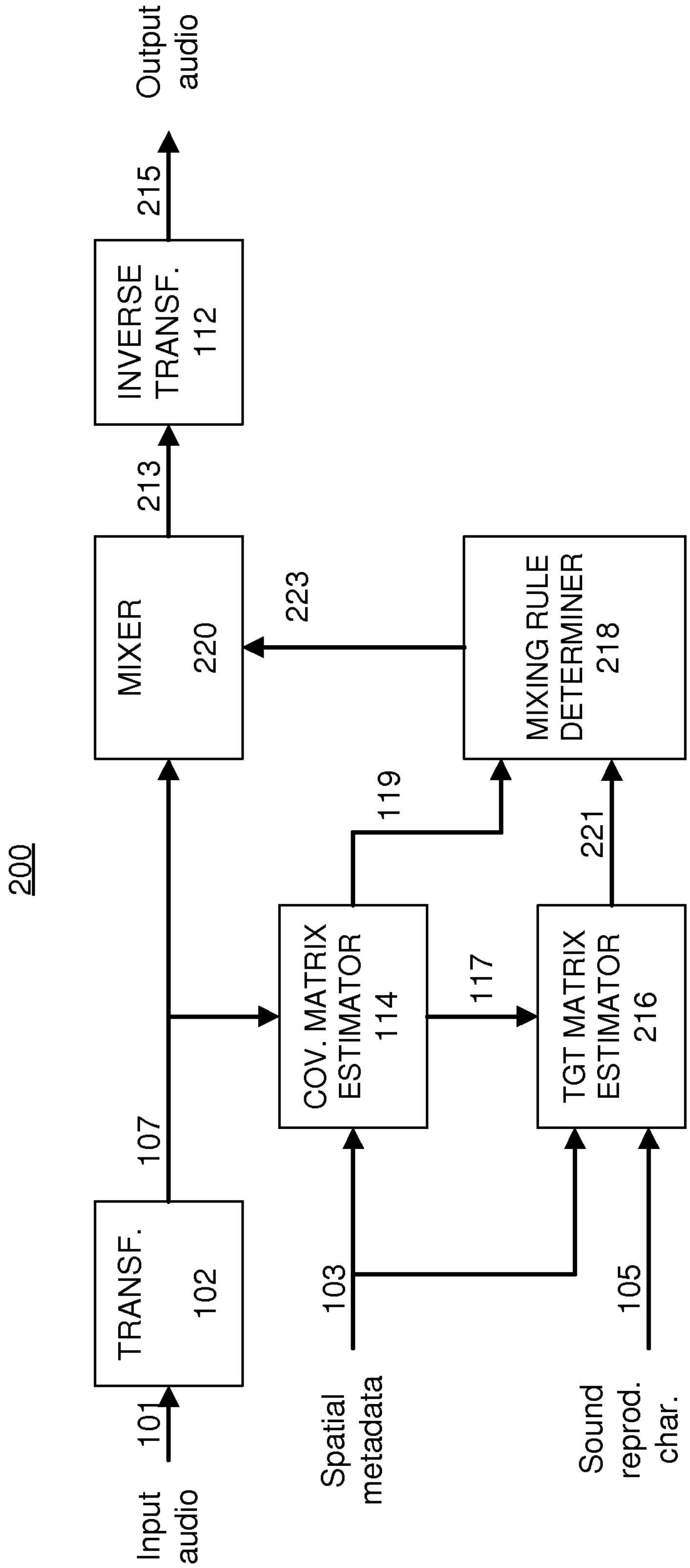
FIG. 6 illustrates a block diagram of some elements of an audio processing system according to an example.

FIG. 6 illustrates a block diagram of some components and/or entities of an audio processing system 200 that may serve as framework for various embodiments of the audio processing technique described in the present disclosure. The audio processing system 200 is a variation of the audio processing system 100 described in the foregoing via a plurality of non-limiting examples. The audio processing system 200 receives the input audio signal 101 and spatial metadata 103 that jointly constitute the parametric spatial audio signal, and the audio processing system 200 further receives the at least one sound reproduction characteristic 105 that serves as control input for controlling some aspects of audio processing in the audio processing system 200. As in the case of the audio processing system 100, the audio processing system 200 enables processing the parametric spatial audio signal into an output audio signal 215 that constitutes an audio output signal of the audio processing system 200.

Like the audio processing system 100, also the audio processing system 200 enables processing the parametric spatial audio signal for playback by loudspeakers of a device, wherein the processing is carried out in dependence of the at least one sound reproduction characteristic 105 of the device, and wherein the processing comprises rendering a first portion of a spatial audio image conveyed by the parametric spatial audio signal using an amplitude panning procedure applied on the input audio signal in dependence of the spatial metadata and said at least one sound reproduction characteristic 105 and rendering a second portion of the spatial audio image using a cross-talk cancelling procedure applied on the input audio signal in dependence of the spatial metadata and said at least one sound reproduction characteristic 105.

As a brief overview, the audio processing system 200 according to the example illustrated in FIG. 6 comprises the transform entity 102 for converting the input audio signal 101 from time domain into the transform domain audio signal 107, the covariance matrix estimator 114 for deriving the covariance matrix 119 and the energy measure 117 based on the transform-domain audio signal 107 in view of the spatial metadata 103, a target matrix estimator 216 for deriving an extended target covariance matrix 221 based on the spatial metadata 103 and the energy measure 117 in view of the at least one sound reproduction characteristic 105, wherein the extended target covariance matrix 221 serves as a target covariance matrix both for sounds included in the first portion of the spatial audio image and for sounds included in the second portion of the spatial audio image, a mixing rule determiner 218 for deriving an extended mixing matrix 223 based on the covariance matrix 119 and the extended target covariance matrix 221, a mixer 220 for deriving the transform-domain output audio signal 213 suitable for loudspeaker reproduction based on the transform-domain audio signal 107 in view of the extended mixing matrix 223, and the inverse transform entity 112 for converting the transform-domain output audio signal 213 into the (time-domain) output audio signal 215 to serve as the output audio signal of the audio processing system 200.

In other examples, the audio processing system 200 may include further entities in addition to those illustrated in FIG. 6 and/or some of the entities depicted in FIG. 6 may combined with other entities while providing the same or corresponding functionality. In particular, the entities illustrated in FIG. 6 serve to represent logical components of the audio processing system 200 that are arranged to perform a respective function but that do not impose structural limitations concerning implementation of the respective entity. Hence, for example, respective hardware means, respective software means or a respective combination of hardware means and software means may be applied to implement any of the entities illustrated in FIG. 6 separately from the other entities, to implement any sub-combination of two or more entities illustrated in FIG. 6, or to implement all entities illustrated in FIG. 6 in combination.

Overall operation of the audio processing system 200, for example, with respect to characteristics of the input audio signal 101, the spatial metadata 103 and the at least one sound reproduction characteristic 105 and with respect to processing of the input audio signal as a sequence of input frames as well as the aspect of implementing the audio processing system 200 by the device 50 are similar to that described in the foregoing for the audio processing system 100. Moreover, the respective operation of the transform entity 102, the covariance matrix estimator 114 and the inverse transform entity 112 is similar to that described in the foregoing in context of the audio processing system 100 (with references to FIGS. 1 and 3).

Still referring to FIG. 6, the target matrix estimator 216 may be arranged to derive the extended target covariance matrix 221 based on the spatial metadata 103 and the energy measure 117 in view of the at least one sound reproduction characteristic 105, wherein the extended target covariance matrix 221 serves as a target covariance matrix both for sounds included in the first portion of the spatial audio image and for sounds included in the second portion of the spatial audio image. The target matrix estimator 216 may be further arranged to provide the extended target covariance matrix 221 to the mixing rule determiner 218 for further processing therein. As in the case of the target matrix estimator 116, for clarity of description, an example that involves spatial audio parameters comprising one or more sound direction parameters that define respective sound directions in a horizontal plane for the one or more frequency sub-bands is described in the following, which readily generalizes into further examples that, additionally or alternatively, involve spatial audio parameters comprising one or more sound direction parameters that define elevation of sound directions for the one or more frequency sub-bands.

The target matrix determiner 216 may be arranged to compute the first and second target covariance matrices 121-1, 121-2 in accordance with the procedures described in the foregoing in context of the target matrix determiner 116. As an example in this regard, the target matrix determiner 216 may derive the first target covariance matrix $C_1(k, n)$ that represents sounds included in the first portion of the spatial audio image according to the equation (4) and derive the second target covariance matrix $C_2(k, n)$ that represents sounds included in the second portion of the spatial audio image according to the equation (6). Moreover, the target matrix determiner 216 may be further arranged to derive, based on the first target covariance matrix $C_1(k)$, an extended first covariance matrix $C'_1(k, n)$ that further accounts for characteristics of the device (e.g. the device 50) applied to implement the audio processing system 200 via usage of the equalization gains $g_{EQ}(i, k)$ described in the foregoing in context of the first portion processor 106 of the audio processing system 100, e.g. as $$C_1'(k,n) = \begin{bmatrix} g_{EQ}(1,k) & 0 \\ 0 & g_{EQ}(2,k) \end{bmatrix} C_1(k,n) \begin{bmatrix} g_{EQ}(1,k) & 0 \\ 0 & g_{EQ}(2,k) \end{bmatrix}. \qquad (12)$$

The target matrix determiner 216 may be further arranged to derive, based on the second target covariance matrix $C_2(k)$, an extended second covariance matrix $C_2(k, n)$, for example, as $$C'_2(k,n)=H(b_{k,mid})C_2(k,n)H^H(b_{k,mid}) \qquad (13)$$

where $H(b_{k,mid})$ denotes a 2×2 matrix of complex-valued filter coefficients in the transform domain. In this regard, $H(b_{k,mid})$ is similar to H(b) defined in context of the equation (10) above, where the index $b_{k,mid}$ refers to a frequency bin that is closest to the center frequency of the frequency sub-band k. The extended first and second target covariance matrices $C'_1(k, n)$, $C'_2(k, n)$ may be applied to derive the (combined) extended target covariance matrix 221, for example, as $$C'_y(k,n)=C'_1(k,n)+C'_2(k,n). \qquad (14)$$

The mixing rule determiner 218 may be arranged to derive the extended mixing matrix 223 based on the covariance matrix 119 and the extended target covariance matrix 221, and to provide the extended mixing matrix 223 to the mixer 220 for further processing therein. The operation of the mixing rule determiner 218 is similar to that of the mixing rule determiner 118 described in the foregoing with the exception of deriving a single mixing matrix that is applicable for processing both sounds included in the first portion of the spatial audio image and sounds included in the second portion of the spatial audio image in the mixer 220. In this regard, the mixing rule determiner 218 may be arranged to apply the formula provided in the appendix of [6] to generate, based on the covariance matrix 119 (e.g. the covariance matrix $C_x(k,n)$) and the extended target covariance matrix 221 (e.g. the extended target covariance matrix $C'_y(k, n)$), a mixing matrix M(k, n) for the frequency sub-band k for the time index n, which may serve as the extended mixing matrix 223 for the respective time-frequency tile.

The mixer 220 may be arranged to derive the transform-domain output audio signal 213 based on the transform-domain audio signal 107 in view of the extended mixing matrix 223, and to provide the transform-domain output audio signal 213 to the inverse transform entity 112 for further processing therein. The mixing procedure carried out by the mixer 220 may comprise deriving the transform-domain output audio signal 213 as a product of the extended mixing matrix 223 and the transform-domain audio signal 107, e.g. as $$\begin{bmatrix} y(1,b,n) \\ y(2,b,n) \end{bmatrix} = M(k,n)x(b,n), \qquad (15)$$

where k denotes the frequency sub-band in which the frequency bin b resides.

The inverse transform entity 112 may be arranged to convert the transform-domain output audio signal 213 into the (time-domain) output audio signal 215 and to provide the output audio signal 215 as the output audio signal of the audio processing system 200 as described in the foregoing.

In the foregoing, the operation of the audio processing systems 100, 100', 200 has been described with (implicit and/or explicit) references to providing each of the first signal component 109-1, the second signal component 109-2, the modified first signal component 111-1, the modified second signal component 111-2, the transform-domain output audio signal 213 and the output audio signal 215 (serving as the output audio signal) as a respective two-channel signal to prepare for sound reproduction via two loudspeakers. This, however, is a non-limiting example chosen for clarity and brevity of description and respective operation of each element of the audio processing system 100, 100', 200 readily generalizes into one that involves processing of three or more channels to account for a loudspeaker arrangement that comprises three or more loudspeakers.

Moreover, the description in the foregoing refers to processing in a plurality of frequency sub-bands. This may involve, for example, carrying out the processing described above for the audio processing systems 100, 100', 200 for a set of frequency sub-bands that cover or substantially cover the frequency spectrum represented by the parametric spatial audio signal in its entirety. In another example, the audio processing procedures described in the foregoing with references to the audio processing systems 100, 100', 200 may be carried out in a predefined portion of the frequency spectrum represented by the parametric spatial audio signal while the output audio signal 215 for the remaining portion of the frequency spectrum may be derived using audio rendering techniques known in the art. In this regard, the predefined portion of the frequency spectrum may comprise predefined one or more frequency sub-bands, for example such that certain frequency sub-bands at the low end of the frequency spectrum and/or at the high end of frequency spectrum are processed using audio rendering mechanisms known in the art whereas the frequency sub-bands therebetween are processed as described in the foregoing with references to the audio processing systems 100, 100', 200.

In a further example, some aspects of the audio processing described in the foregoing with references to the audio processing systems 100, 100', 200 may be replaced with different audio rendering techniques in predefined frequency sub-bands, for example, in certain frequency sub-bands at the low end of the frequency spectrum and/or at the high end of frequency spectrum. As an example, in the audio processing systems 100, 100' this may be accomplished by omitting the cross-talk cancellation processing described in the foregoing with references to the second portion processor 108 at certain frequency sub-bands at the low end of the frequency spectrum and/or at the high end of frequency spectrum while in the audio processing system 200 this may be provided by omitting the contribution from the cross-talk cancelling filters $H(b_{k,mid})$ in preparation of the extended target covariance matrix $C'_y(k, n)$ in the target matrix estimator 216 at certain frequency sub-bands at the low end of the frequency spectrum and/or at the high end of frequency spectrum (e.g. by setting the filtering gains $H_{RL}(b)$ and $H_{LR}(b)$ to zero and by setting the filtering gains $H_{LL}(b)$ and $H_{RR}(b)$ to unity).

In another example, the binaural synthesis in the target matrix estimator 116, 216 with respect to generation of the second target covariance matrix 121-2 (e.g. $C_2(k, n)$) may be omitted at certain frequency sub-bands at the low end of the frequency spectrum and/or at the high end of frequency spectrum and replaced by an amplitude panning technique. This may be accomplished, for example, by replacing the HRTFs h(k, n) in the equation (6) with suitable amplitude panning gains and replacing the diffuse field covariance matrix in the equation (6) with an identity matrix. Also in this example, in the case of the audio processing systems 100, 100' the cross-talk cancellation processing described in the foregoing with references to the second portion processor 108 should be omitted in the certain frequency sub-bands at the low end of the frequency spectrum and/or at the high end of frequency spectrum, whereas in the case of the audio processing system 200 the contribution from the cross-talk cancelling filters $H(b_{k,mid})$ in preparation of the extended target covariance matrix $C'_y(k, n)$ in the target matrix estimator 216 should be omitted at the certain frequency sub-bands at the low end of the frequency spectrum and/or at the high end of frequency spectrum.

Figure 7:
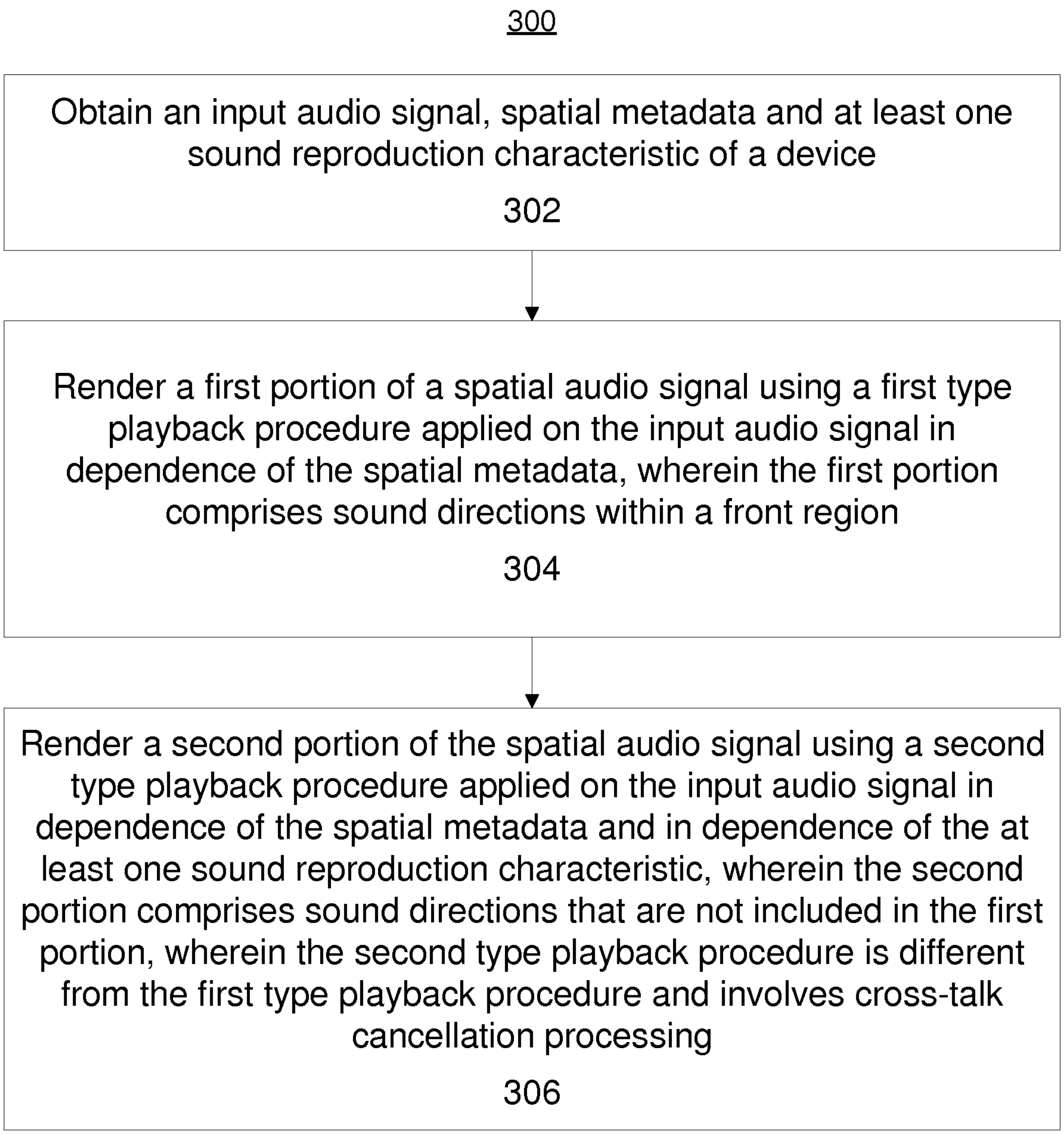
FIG. 7 illustrates a flow chart depicting a method for audio processing according to an example.

The logical elements of the audio processing system 100, 100', 200 may be arranged to operate, for example, in accordance with a method 300 illustrated by a flowchart depicted in FIG. 7. The method 300 serves as a method for processing the input audio signal 101 in accordance with the spatial metadata 103 so as to play back a spatial audio signal in a device, wherein the processing is carried out in dependence of the at least one sound reproduction characteristic 105 of the device. The method 300 may be varied in a number of ways, for example in view of the examples concerning operation of any of the audio processing systems 100, 100' and/or 200 described in the foregoing.

The method 300 comprises obtaining the input audio signal 101, the spatial metadata 103 and the at least one sound reproduction characteristic 105 of the device, as indicated in block 302. The method 300 further comprises rendering the first portion of the spatial audio signal using a first type playback procedure applied on the input audio signal 101 in dependence of the spatial metadata 103, wherein the first portion comprises sound directions within a front region, as indicated in block 304, and rendering the second portion of the spatial audio image using a cross-talk cancelling procedure applied on the input audio signal 101 in dependence of the spatial metadata 104 and in dependence of the at least one sound reproduction characteristic 105, wherein the second portion comprises sound directions that are not included in the first portion and where the second type playback procedure is different from the first playback procedure and involves cross-talk cancellation processing.

Figure 8:
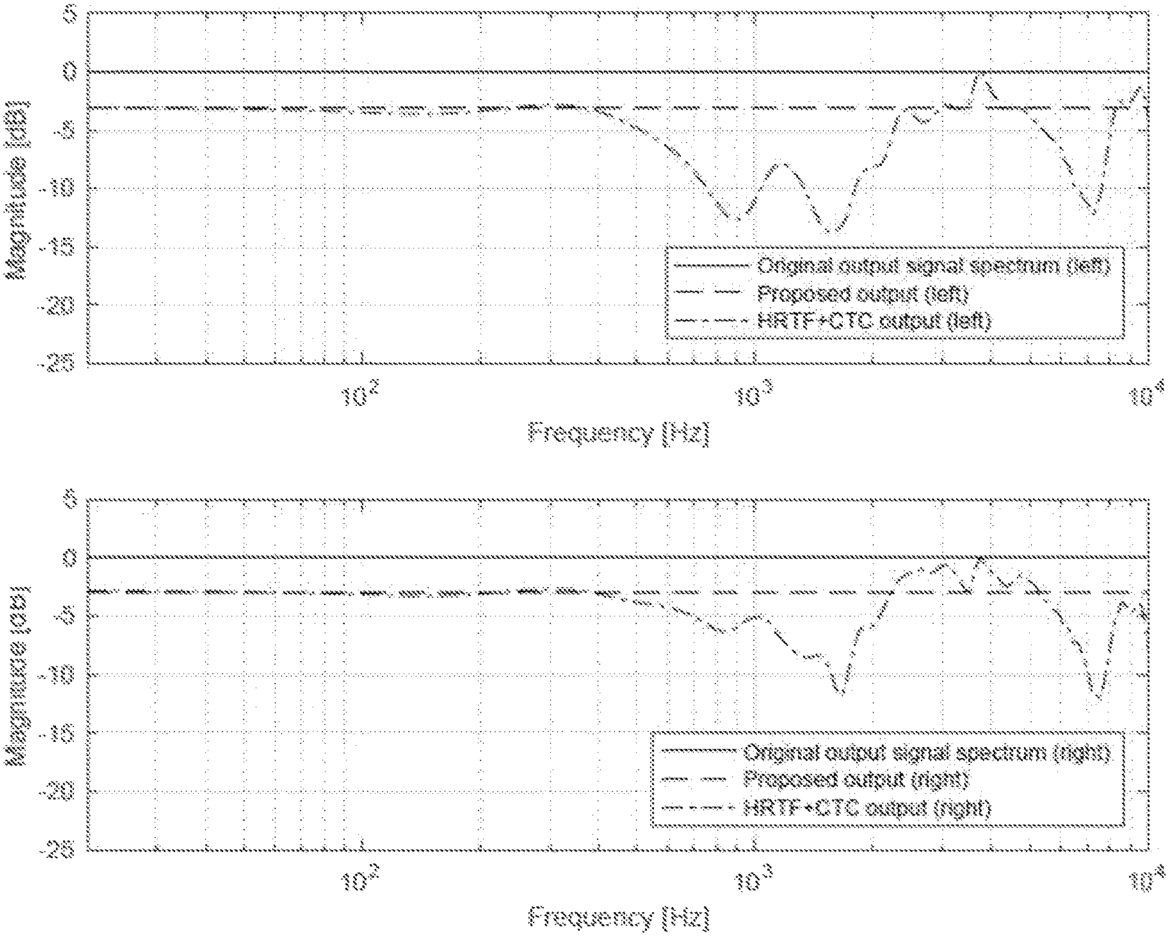
FIG. 8 illustrates an example of performance obtainable via operation of an audio processing system according to an example.

FIG. 8 illustrates an example of performance obtainable via operation of the audio processing system 100, 100', 200 (labelled as "Proposed output" in the illustration) in comparison to a previously known audio processing technique that involves binaural synthesis in combination with a generic cross-talk cancellation technique (labelled as "HRTF+CTC output" in the illustration). In the illustration of FIG. 8, the upper graph depicts the magnitude spectrum of the left channel and the lower graph depicts the magnitude spectrum of the right channel, obtained via processing an exemplifying parametric audio signal that includes an impulse as the input audio signal 101 and spatial metadata 103 that defines a zero-degree sound direction and direct-to-total energy ratio of one for all frequency sub-bands, the exemplifying parametric audio signal hence modeling a sound source directly in front of the assumed listening point in anechoic conditions. FIG. 8 illustrates the magnitude responses of the input audio signal as respective solid curves, the magnitude responses of the output audio signal 115, 215 obtained via processing by the audio processing system 100, 100', 200 as respective dashed curves, and the magnitude responses of the processed audio signal obtained using the previously known audio processing technique as respective dash-dotted curves.

As shown in the illustration of FIG. 8, the impulse-containing input audio signal 101 directly in front of the assumed listening point in anechoic conditions results flat magnitude spectrum in both the left and right channels. Due to the amplitude panning technique applied by the audio processing system 100, 100', 200 for the impulse that is in the first portion of the spatial audio image (e.g. in the front region), the magnitude response of the output audio signal 115, 215 is substantially similar to that of the input audio signal 101 apart from being slightly (approximately 3 dB) attenuated due to application of the amplitude panning gains. Consequently, no coloring of the signal occurs, thereby enabling reproducing good timbre to the listener. In contrast, the previously known audio processing technique where the input audio is processed into binaural signals (via usage of HRTFs) that are further subjected to cross-talk cancellation procedure results in significant distortions in the magnitude spectrum especially in the high end of the frequency spectrum in both channels, which results in coloration and degraded timbre of the reproduced sound that may be avoided via usage of the audio processing system 100, 100', 200.

Figure 9:
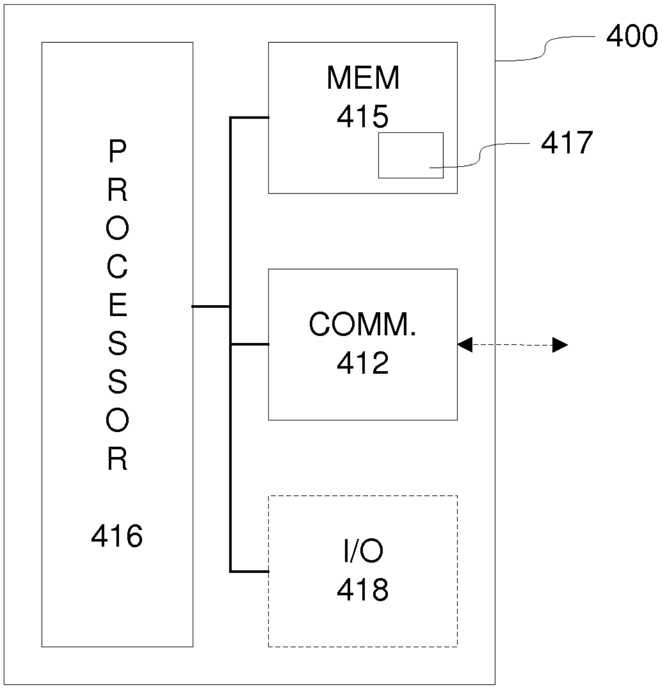
FIG. 9 illustrates a block diagram of some elements of an apparatus according to an example.

FIG. 9 illustrates a block diagram of some components of an exemplifying apparatus 400. The apparatus 400 may comprise further components, elements or portions that are not depicted in FIG. 9. The apparatus 400 may be employed e.g. in implementing one or more components described in the foregoing in context of the audio processing system 100, 100', 200. The apparatus 400 may implement, for example, the device 50 or one or more components thereof.

The apparatus 400 comprises a processor 416 and a memory 415 for storing data and computer program code 417. The memory 415 and a portion of the computer program code 417 stored therein may be further arranged to, with the processor 416, to implement at least some of the operations, procedures and/or functions described in the foregoing in context of the audio processing system 100, 100', 200.

The apparatus 400 comprises a communication portion 412 for communication with other devices. The communication portion 412 comprises at least one communication apparatus that enables wired or wireless communication with other apparatuses. A communication apparatus of the communication portion 412 may also be referred to as a respective communication means.

The apparatus 400 may further comprise user I/O (input/output) components 418 that may be arranged, possibly together with the processor 416 and a portion of the computer program code 417, to provide a user interface for receiving input from a user of the apparatus 400 and/or providing output to the user of the apparatus 400 to control at least some aspects of operation of the audio processing system 100, 100', 200 implemented by the apparatus 400. The user I/O components 418 may comprise hardware components such as a display, a touchscreen, a touchpad, a mouse, a keyboard, and/or an arrangement of one or more keys or buttons, etc. The user I/O components 418 may be also referred to as peripherals. The processor 416 may be arranged to control operation of the apparatus 400 e.g. in accordance with a portion of the computer program code 417 and possibly further in accordance with the user input received via the user I/O components 418 and/or in accordance with information received via the communication portion 412.

Although the processor 416 is depicted as a single component, it may be implemented as one or more separate processing components. Similarly, although the memory 415 is depicted as a single component, it may be implemented as one or more separate components, some or all of which may be integrated/removable and/or may provide permanent/semi-permanent/dynamic/cached storage.

The computer program code 417 stored in the memory 415, may comprise computer-executable instructions that control one or more aspects of operation of the apparatus 400 when loaded into the processor 416. As an example, the computer-executable instructions may be provided as one or more sequences of one or more instructions. The processor 416 is able to load and execute the computer program code 417 by reading the one or more sequences of one or more instructions included therein from the memory 415. The one or more sequences of one or more instructions may be configured to, when executed by the processor 416, cause the apparatus 400 to carry out at least some of the operations, procedures and/or functions described in the foregoing in context of the audio processing system 100, 100', 200.

Hence, the apparatus 400 may comprise at least one processor 416 and at least one memory 415 including the computer program code 417 for one or more programs, the at least one memory 415 and the computer program code 417 configured to, with the at least one processor 416, cause the apparatus 400 to perform at least some of the operations, procedures and/or functions described in the foregoing in context of the audio processing system 100, 100', 200.

The computer program(s) stored in the memory 415 may be provided e.g. as a respective computer program product comprising at least one computer-readable non-transitory medium having the computer program code 417 stored thereon, the computer program code, when executed by the apparatus 400, causes the apparatus 400 at least to perform at least some of the operations, procedures and/or functions described in the foregoing in context of the audio processing system 100, 100', 200. The computer-readable non-transitory medium may comprise a memory device or a record medium such as a CD-ROM, a DVD, a Blu-ray disc or another article of manufacture that tangibly embodies the computer program. As another example, the computer program may be provided as a signal configured to reliably transfer the computer program.

Reference(s) to a processor should not be understood to encompass only programmable processors, but also dedicated circuits such as field-programmable gate arrays (FPGA), application specific circuits (ASIC), signal processors, etc. Features described in the preceding description may be used in combinations other than the combinations explicitly described.

Although in the foregoing some functions have been described with reference to certain features and/or elements, those functions may be performable by other features and/or elements whether described or not. Although features have been described with reference to certain embodiments, those features may also be present in other embodiments whether described or not.

The invention claimed is:

1. A method for processing an input audio signal in accordance with spatial metadata so as to play back a spatial audio signal in a device in dependence of at least one sound reproduction characteristic of the device, the method comprising:

obtaining, by the device, said input audio signal;

obtaining, by the device, said spatial metadata, separate from obtaining said input audio signal;

obtaining said at least one sound reproduction characteristic of the device;

rendering, by the device, a first portion of the spatial audio signal using a first type playback procedure applied on the input audio signal in dependence of the spatial metadata, wherein the first portion comprises sound directions within a front region; and rendering, by the device, a second portion of the spatial audio signal using a second type playback procedure applied on the input audio signal in dependence of the spatial metadata and in dependence of said at least one sound reproduction characteristic, wherein the second portion comprises sound directions that are not included in the first portion and where the second type playback procedure is different from the first type playback procedure and involves cross-talk cancellation processing.

2. A method according to claim 1, wherein the processing is carried out separately in a plurality of frequency sub-bands.

3. A method according to claim 1, wherein said spatial metadata comprises, for one or more frequency sub-bands,
a respective sound direction parameter, and
a respective energy ratio parameter.

4. A method according to claim 1, wherein the first portion comprises a first portion of a spatial audio image conveyed by the spatial audio signal and wherein the second portion comprises a second portion of the spatial audio image, where in the second portion is a portion substantially different from the first portion.

5. A method according to claim 4, wherein
the first portion represents directional sounds of the spatial audio image that are within a front region, and
the second portion represents directional sounds of the spatial audio image that are outside the front region and non-directional sounds of the spatial audio image.

6. A method according to claim 1, wherein the front region comprises a predefined range of sound directions.

7. A method according to claim 1,
wherein the at least one sound reproduction characteristic comprises respective definitions of loudspeaker positions in relation to a reference position with respect to the device, and
wherein the method comprises defining a range of sound directions that belong to the front region based on the loudspeaker positions.

8. A method according to claim 1, wherein the first type playback procedure comprises an amplitude panning procedure.

9. A method according to claim 1, wherein the first type playback procedure comprises
processing with one of:
involving cross-talk cancellation processing that is arranged to provide a substantially lesser cross-talk cancellation effect in comparison to the cancellation processing involved in the second type playback procedure; and
not involving cross-talk cancellation processing.

10. A method according to claim 1,
wherein rendering the first portion comprises deriving, based on the input audio signal, using the first type playback procedure in dependence of the spatial metadata, a first signal component that represents the first portion, and
wherein rendering the second portion comprises deriving, based on the input audio signal, using the second type playback procedure in dependence of the spatial metadata and in dependence of said at least one sound reproduction characteristic, a second signal component that represents the second portion.

11. A method according to claim 10, comprising:
deriving a covariance matrix and an energy measure based on the input audio signal;
deriving, based on the energy measure, on the spatial metadata and on the at least one sound reproduction characteristic, a first target covariance matrix that represents the first portion and a second target covariance matrix that represents the second portion;
deriving, based on the covariance matrix and on the first target covariance matrix, a first mixing matrix that, when applied to the input audio signal, results in a modified audio signal having a covariance matrix that is similar to the first target covariance matrix;
deriving, based on the covariance matrix and on the second target covariance matrix, a second mixing matrix that, when applied to the input audio signal, results in a modified audio signal having a covariance matrix that is similar to the second target covariance matrix; and
deriving the first signal component as a product of the input audio signal and the first mixing matrix and deriving the second signal component as a product of the input audio signal and the second mixing matrix.

12. A method according to claim 11, wherein deriving the first target covariance matrix comprises:
deriving, based on a sound direction parameter included in the spatial metadata, an energy divisor value that indicates an extent of inclusion in the first portion;
determining, based on the sound direction parameter, panning gains; and
deriving the first target covariance matrix based on the energy measure, on the panning gains, on the energy divisor value and on an energy ratio parameter included in the spatial metadata.

13. A method according to claim 11, wherein deriving the second target covariance matrix comprises:
deriving, based on a sound direction parameter included in the spatial metadata and on the at least one sound reproduction characteristic, an energy divisor value that indicates an extent of inclusion in the first portion;
determining, based on a sound direction parameter included in the spatial metadata, a head-related transfer function, HRTF;
deriving, based on HRTFs spanning across a predefined range of sound directions, a diffuse field covariance matrix; and
deriving the second target covariance matrix based on the energy measure, on the HRTF, on the diffuse field covariance matrix and on an energy ratio parameter included in the spatial metadata.

14. A method according to claim 10, wherein deriving the first signal component comprises multiplying the first signal component using a gain value that is based on predefined equalization information included in the at least one sound reproduction characteristic.

15. A method according to claim 10, wherein deriving the second signal component comprises:
deriving a set of cross-talk cancelling gains based on reference transfer functions included in the at least one sound reproduction characteristic; and
applying the set of cross-talk cancelling gains to the second signal component.

16. A method according to claim 15,
wherein the reference transfer functions comprise:
a reference transfer function from a first loudspeaker to the left ear of a user positioned in a reference position with respect to the device, a reference transfer function from the first loudspeaker to the right ear of the user positioned in said reference position,
a reference transfer function from a second loudspeaker to the left ear of the user positioned in said reference position, and
a reference transfer function from the second loudspeaker to the right ear of the user positioned in said reference position; and
wherein the set of cross-talk cancelling gains comprises:
a cross-talk cancelling gain from the first loudspeaker to a left channel of the second signal component, a cross-talk cancelling gain from the first loudspeaker to a right channel of the second signal component, a cross-talk cancelling gain from the second loudspeaker to the left channel of the second signal component, and a cross-talk cancelling gain from the second loudspeaker to the right channel of the second signal component.

17. A method according to claim 10, further comprising deriving an output audio signal for playback by the device as a combination of the first and second signal components.

18. A method according to claim 1, comprising:

deriving a covariance matrix and an energy measure based on the input audio signal;

deriving, based on the energy measure, on the spatial metadata and on the at least one sound reproduction characteristic, a first target covariance matrix that represents the first portion and a second target covariance matrix that represents the second portion;

deriving an extended first target covariance matrix based on the first target covariance matrix and using a gain value that is based on predefined equalization information included in the at least one sound reproduction characteristic;

deriving an extended second target covariance matrix based on the second target covariance matrix and on cross-talk cancelling gains;

deriving a target covariance matrix as a combination of the extended first target covariance matrix and the extended second target covariance matrix;

deriving, based on the covariance matrix and on the target covariance matrix, a mixing matrix that, when applied to the input audio signal, results in a modified audio signal having a covariance matrix that is similar to the target covariance matrix; and deriving an output audio signal, for playback by the device, as a product of the input audio signal and the respective mixing matrix.

19. A computer program product comprising at least one computer-readable non-transitory medium having computer readable program code stored thereon, the computer readable program code configured to cause performing of the method of claim 1 when said program code is run on a computing apparatus.

20. An apparatus for processing an input audio signal in accordance with spatial metadata so as to play back a spatial audio signal in a device in dependence of at least one sound reproduction characteristic of the device, the apparatus comprising at least one processor and at least one memory including computer program code, when executed by the at least one processor, cause the apparatus to:

obtain said input audio signal;

obtain said spatial metadata, separate from obtaining said input audio signal;

obtain said at least one sound reproduction characteristic of the device;

render a first portion of the spatial audio signal using a first type playback procedure applied on the input audio signal in dependence of the spatial metadata, wherein the first portion comprises sound directions within a front region; and render a second portion of the spatial audio signal using a second type playback procedure applied on the input audio signal in dependence of the spatial metadata and in dependence of said at least one sound reproduction characteristic, wherein the second portion comprises sound directions that are not included in the first portion and where the second type playback procedure is different from the first type playback procedure and involves cross-talk cancellation processing.

* * * * *